United States Patent [19]

Bailey, III

[11] Patent Number: 5,659,614
[45] Date of Patent: Aug. 19, 1997

[54] METHOD AND SYSTEM FOR CREATING AND STORING A BACKUP COPY OF FILE DATA STORED ON A COMPUTER

[76] Inventor: John E. Bailey, III, 207 Leafmore Rd., Rome, Ga. 30165

[21] Appl. No.: 345,938

[22] Filed: Nov. 28, 1994

[51] Int. Cl.$^6$ ........................................................ H04L 9/00
[52] U.S. Cl. ............................ 380/4; 380/25; 395/601; 364/222.82; 364/268
[58] Field of Search .......................... 380/3, 4, 23, 25, 380/49, 50; 395/600, 575; 364/222.82, 268, 268.2, 285.1

[56] References Cited

U.S. PATENT DOCUMENTS

| | | |
|---|---|---|
| 4,361,832 | 11/1982 | Cole . |
| 4,377,000 | 3/1983 | Staab . |
| 4,727,509 | 2/1988 | Johnson et al. . |
| 4,792,896 | 12/1988 | Maclean et al. . |
| 4,819,154 | 4/1989 | Stiffler et al. . |
| 4,910,666 | 3/1990 | Nibby et al. . |
| 4,914,576 | 4/1990 | Zelley et al. . |
| 5,003,936 | 4/1991 | Hamilton et al. ............... 380/50 |
| 5,155,845 | 10/1992 | Beal et al. . |
| 5,163,148 | 11/1992 | Walls . |
| 5,212,784 | 5/1993 | Sparks . |
| 5,495,533 | 2/1996 | Linehan et al. ............... 380/25 |

Primary Examiner—David C. Cain
Attorney, Agent, or Firm—Jones & Askew

[57] ABSTRACT

A method and system for prioritizing, securing, and reducing the amount of data transmitted and stored during the creation of a backup copy of file data. Sectors in which changes have been made are identified as are the actual changes made to the sectors. Only the actual changes within each changed sector, along with the HCS number and a byte offset identifying the location within the sector at which the changes occur, are transmitted to the backup site. Files that are to be transmitted to the backup site are prioritized according to ratings based on predetermined criteria. Higher rated files are transmitted to the backup site prior to lower rated files. The files that are to be transmitted to the backup site are encoded and double encrypted. All instances of predetermined client-specific data elements within each file are identified and replaced by a corresponding code prior to encryption. The file data is then encrypted using multiple, indirect encryption keys, variable block lengths, and variable algorithms based on a client-selected string of characters. The files are thereafter encrypted again at the client site prior to transmission to the backup site. A program registry is maintained at the backup site that contains a master copy of many commercially-available files. The incoming files received from the client site are compared to the files in the program registry. If an incoming file is located in the registry, the file is replaced by a token identifying the commercially-available file and the token is stored at the backup facility.

36 Claims, 14 Drawing Sheets

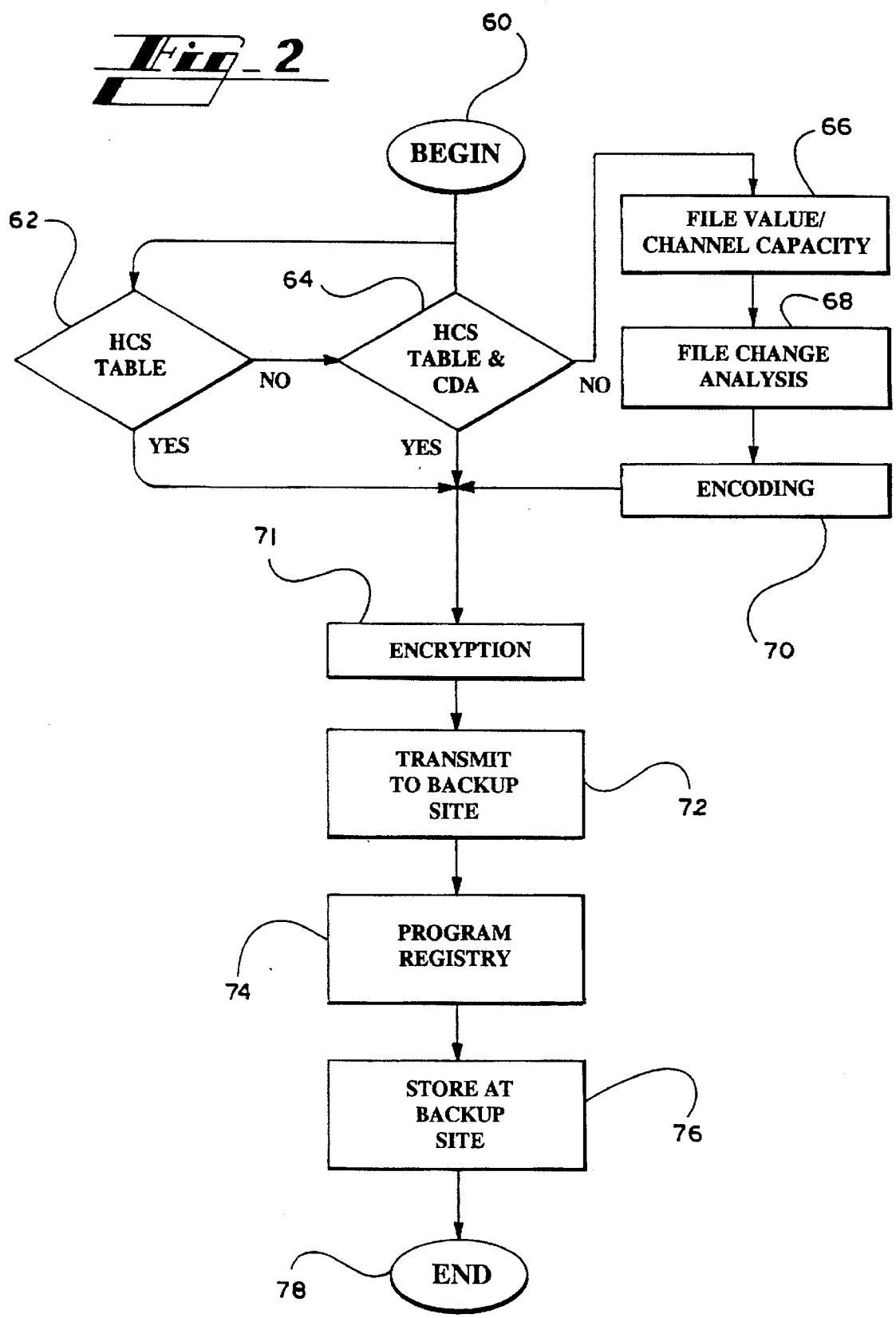

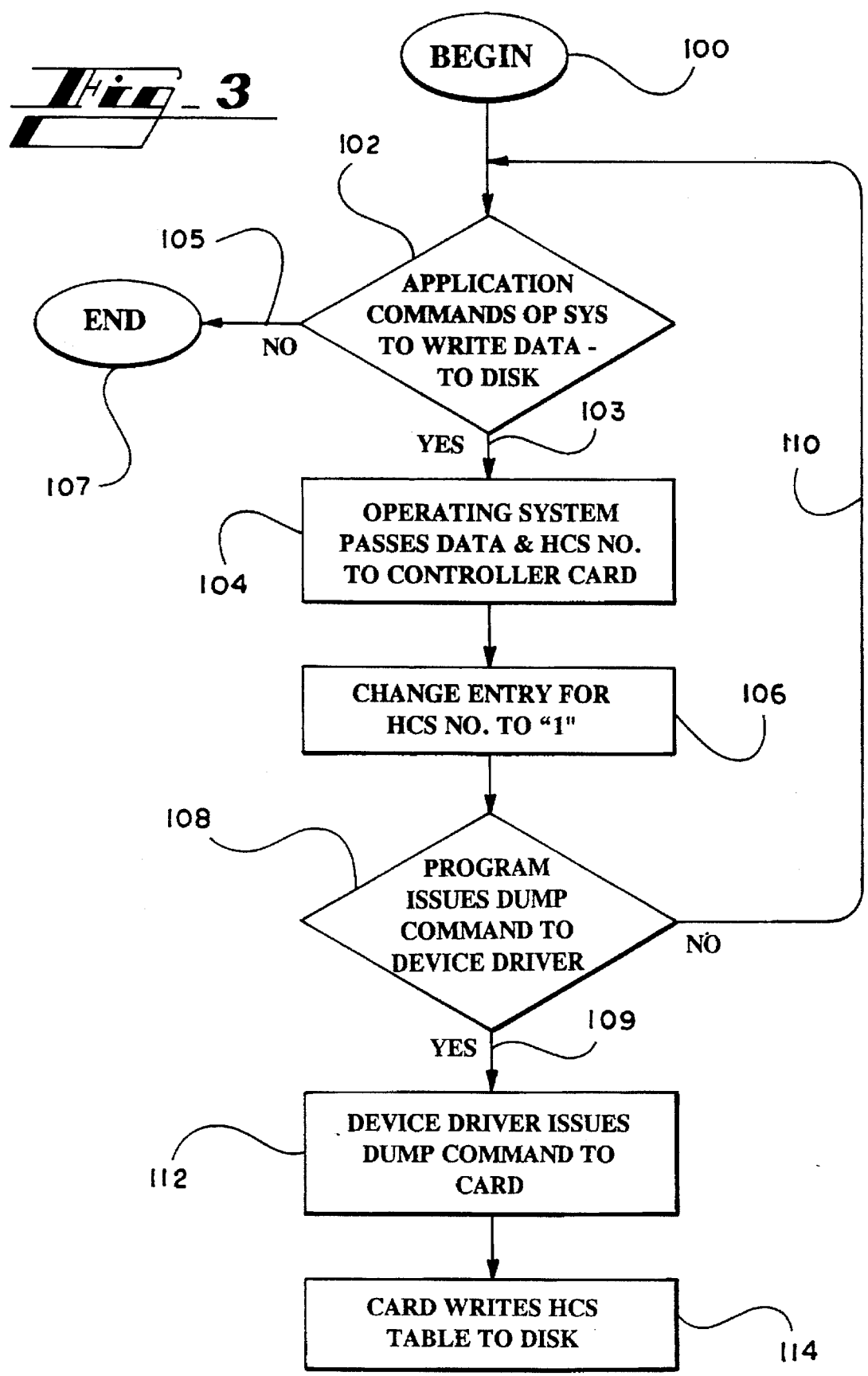
Fig_3

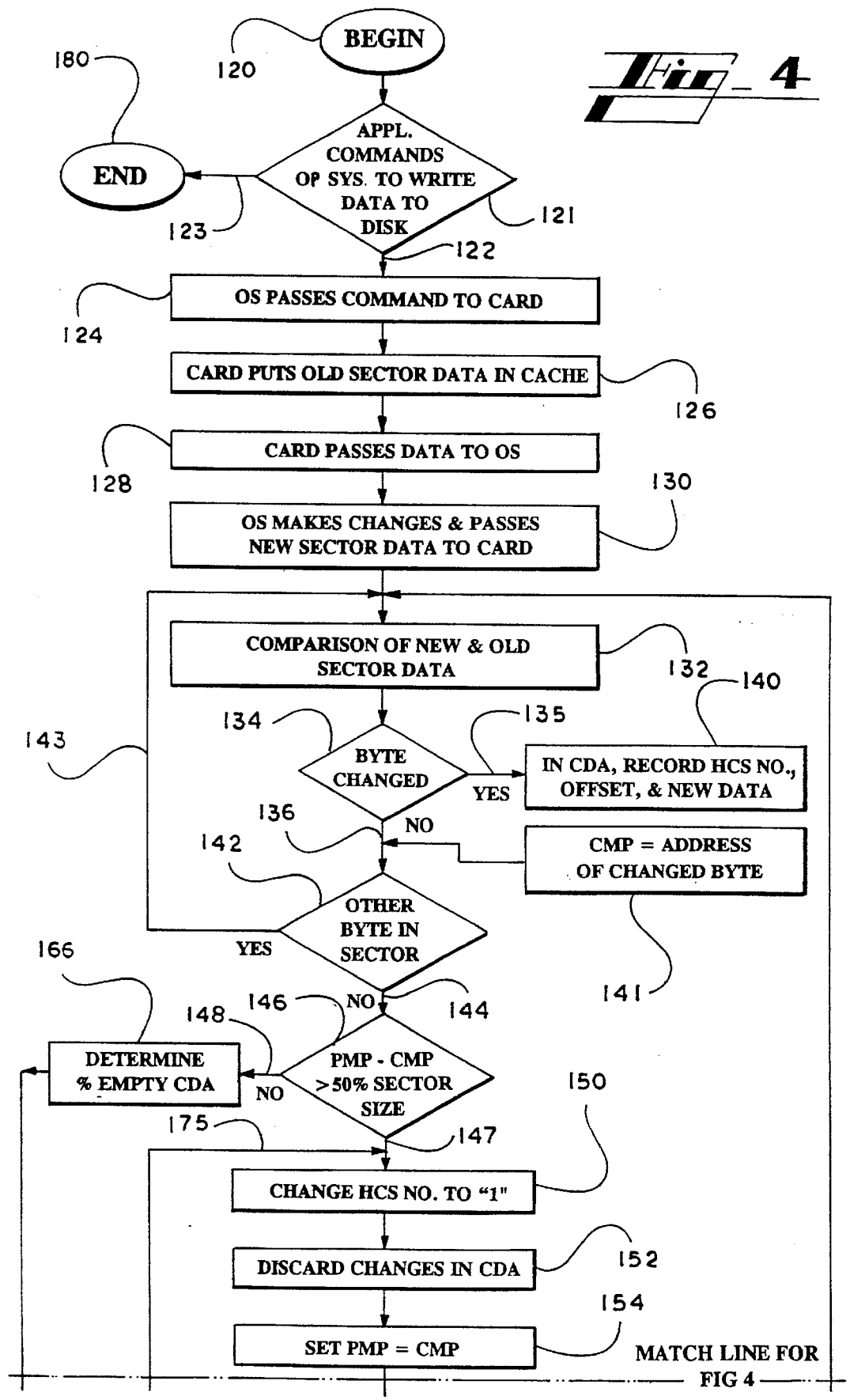

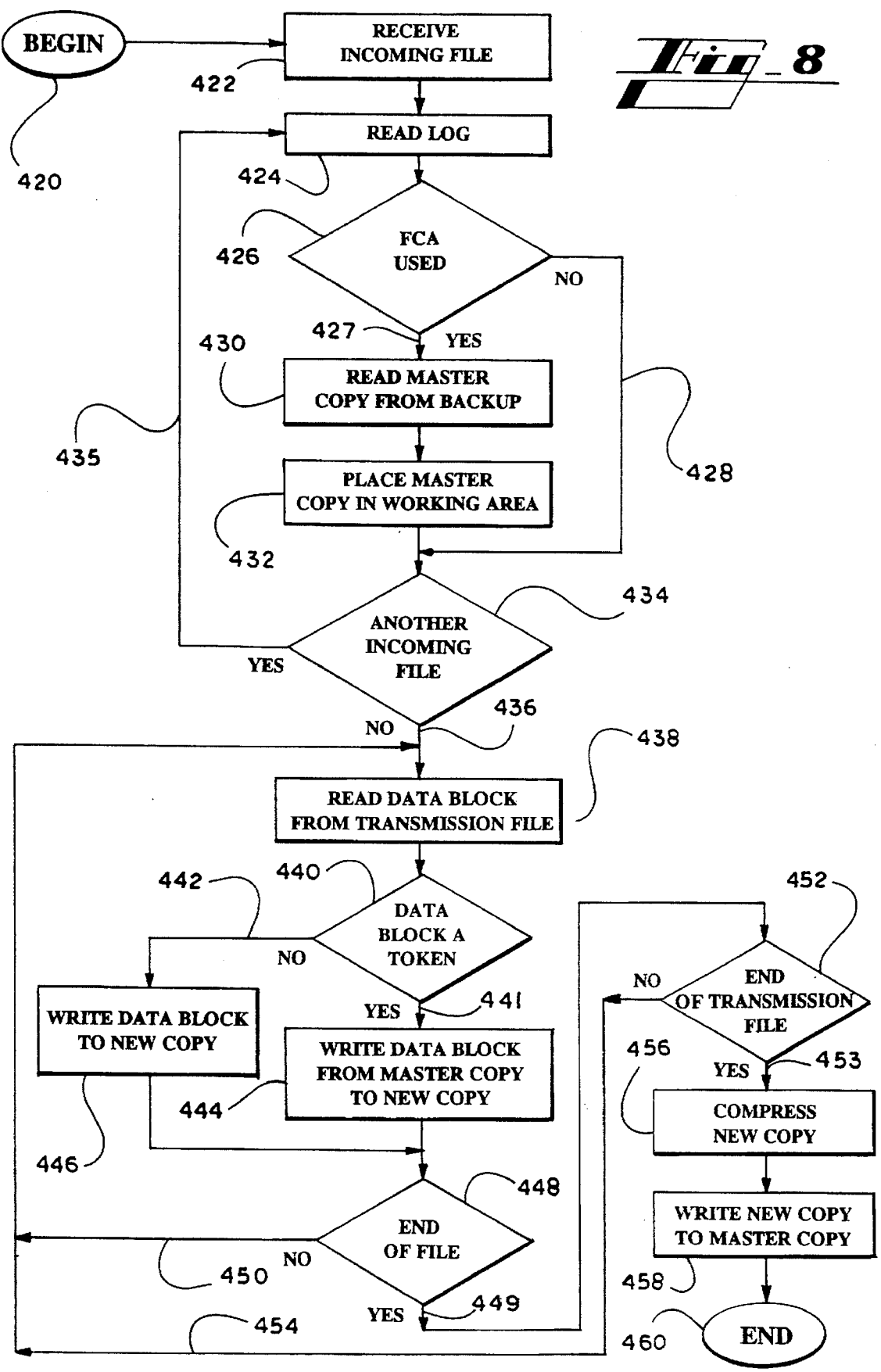

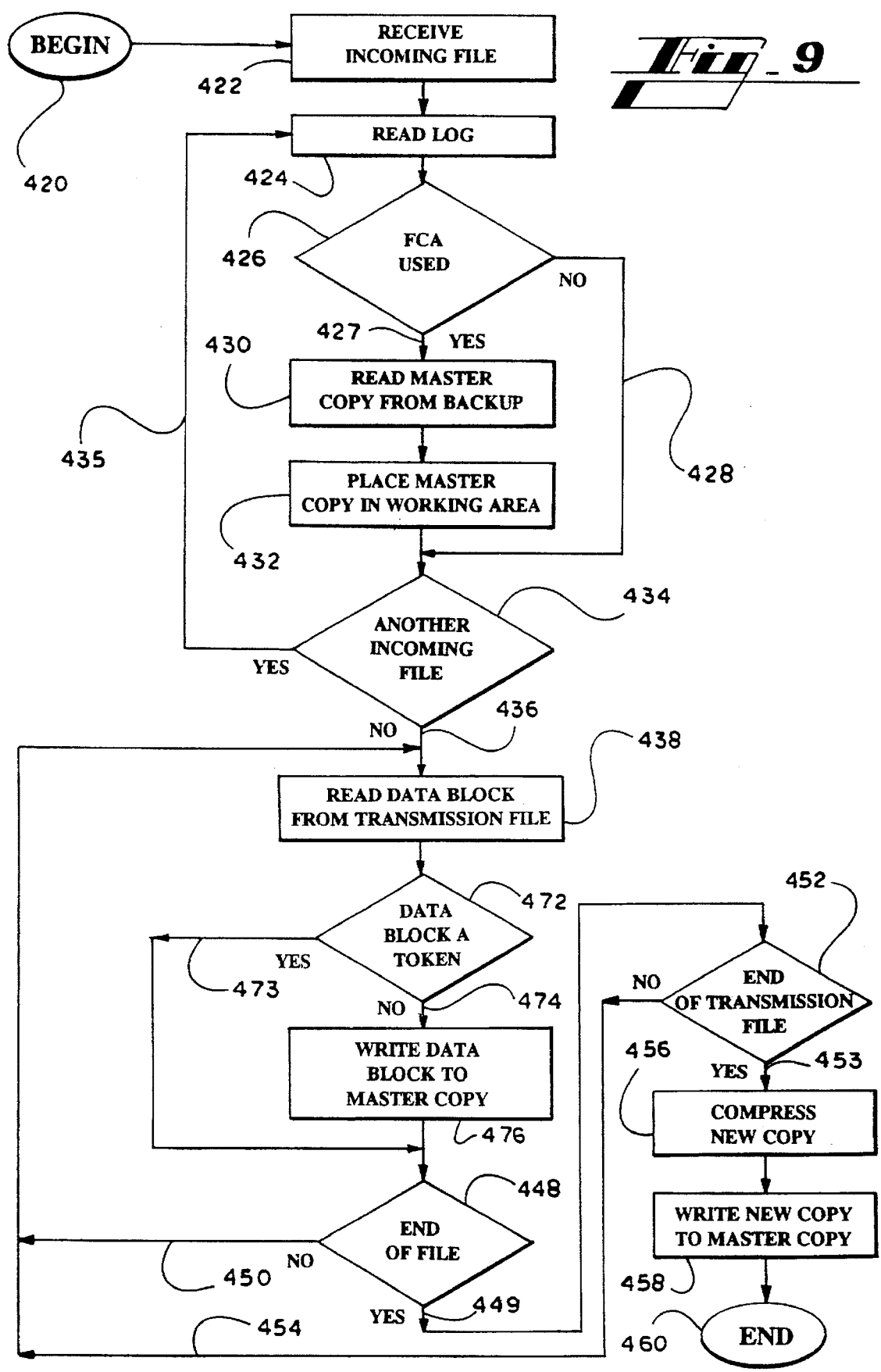

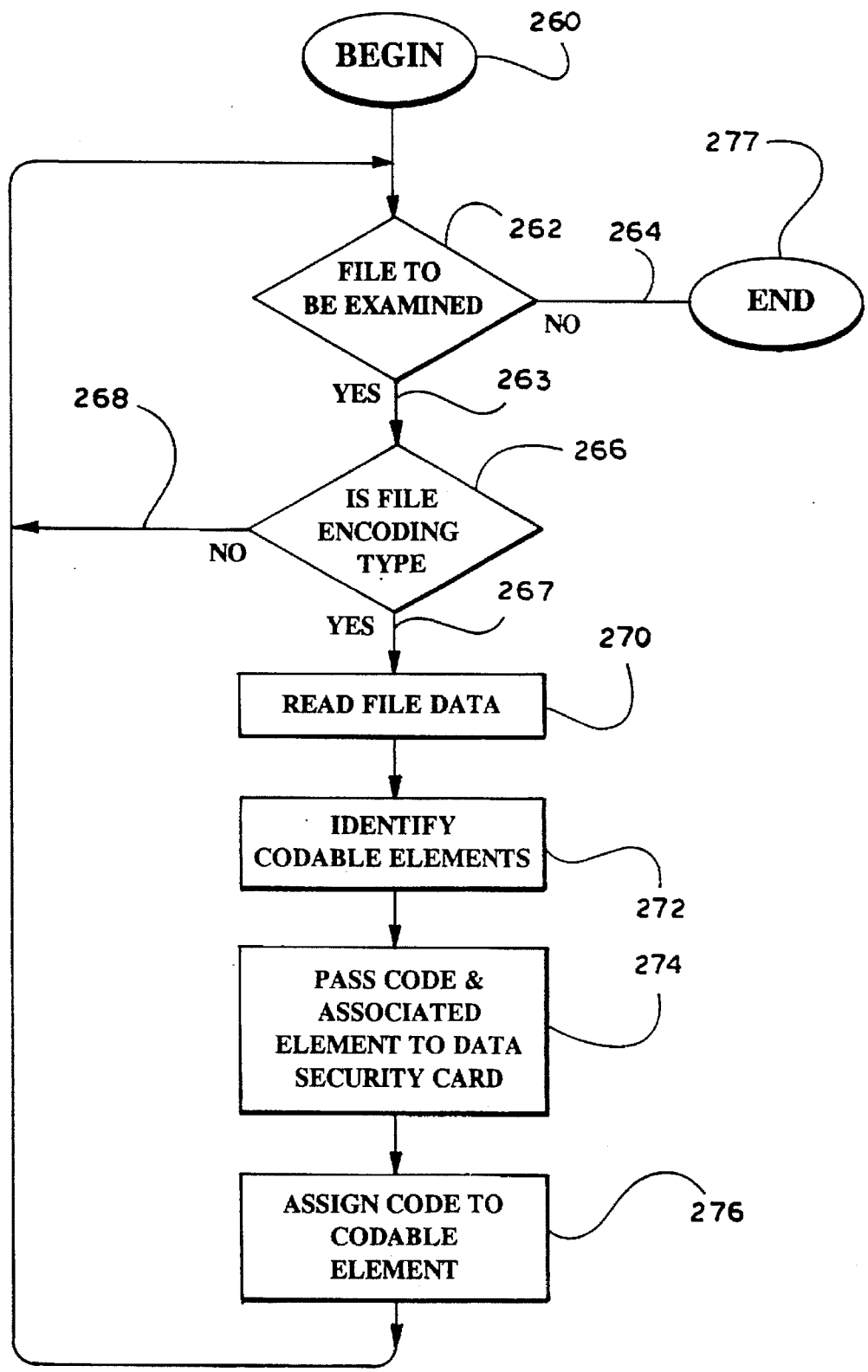

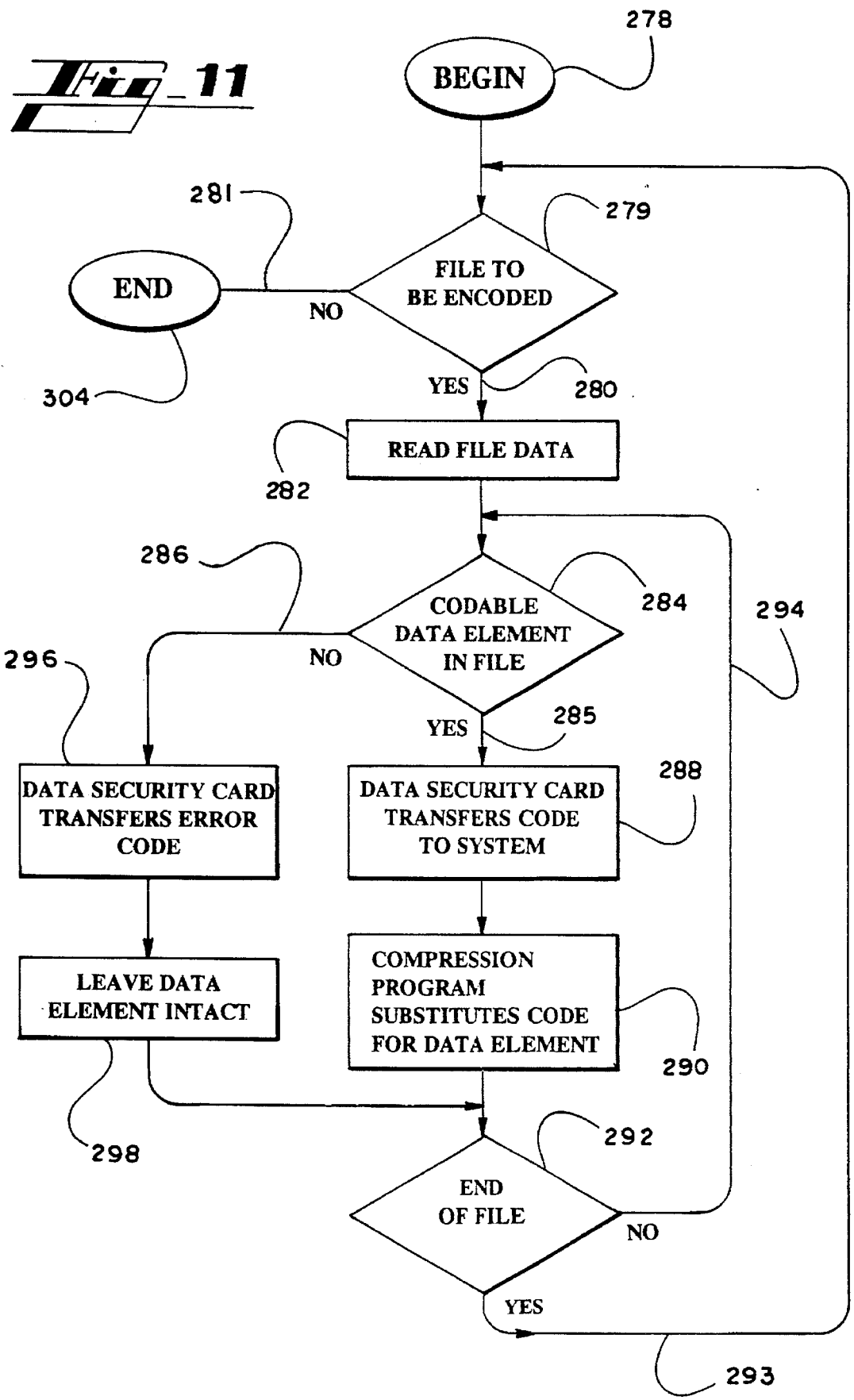

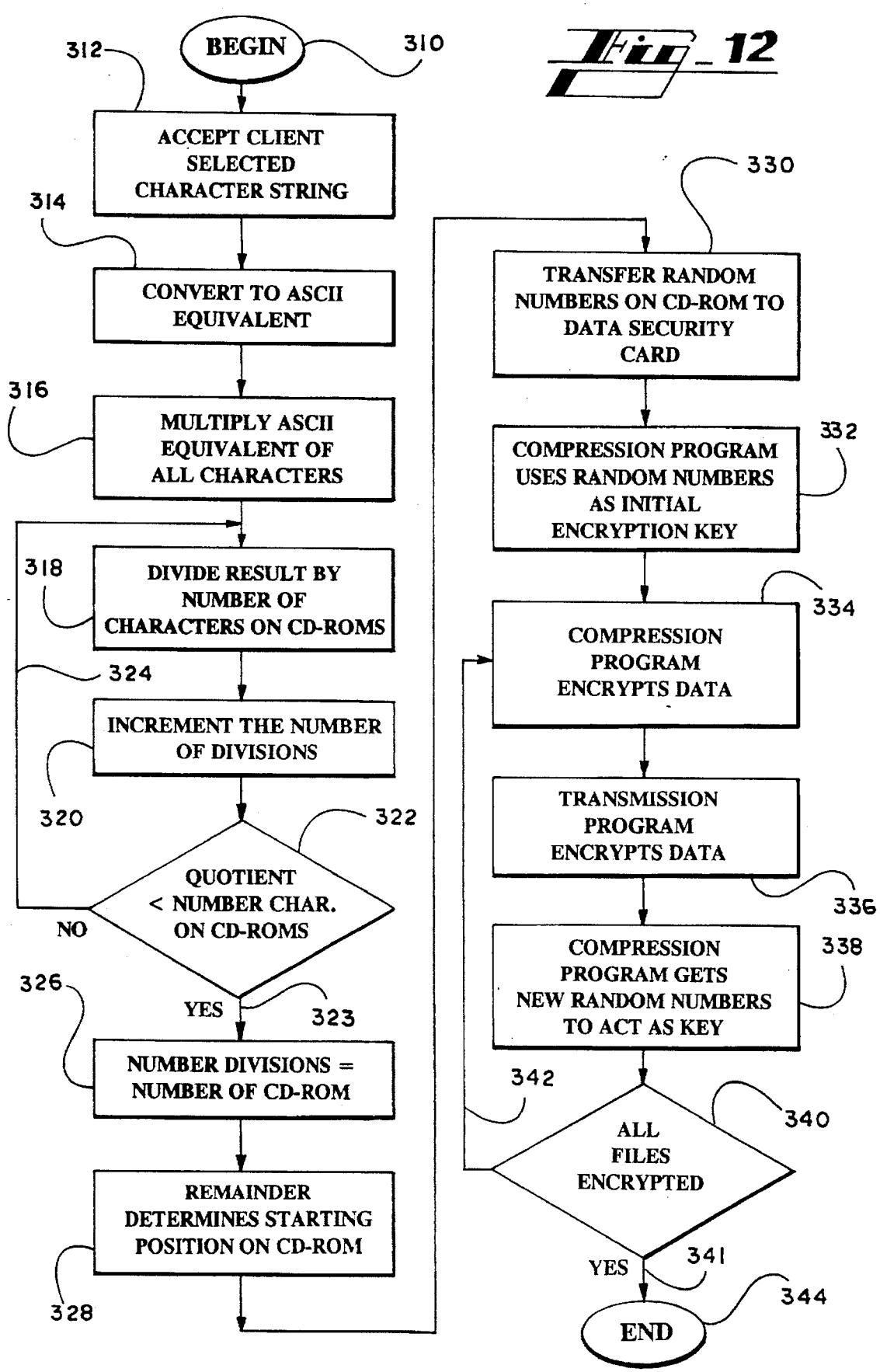

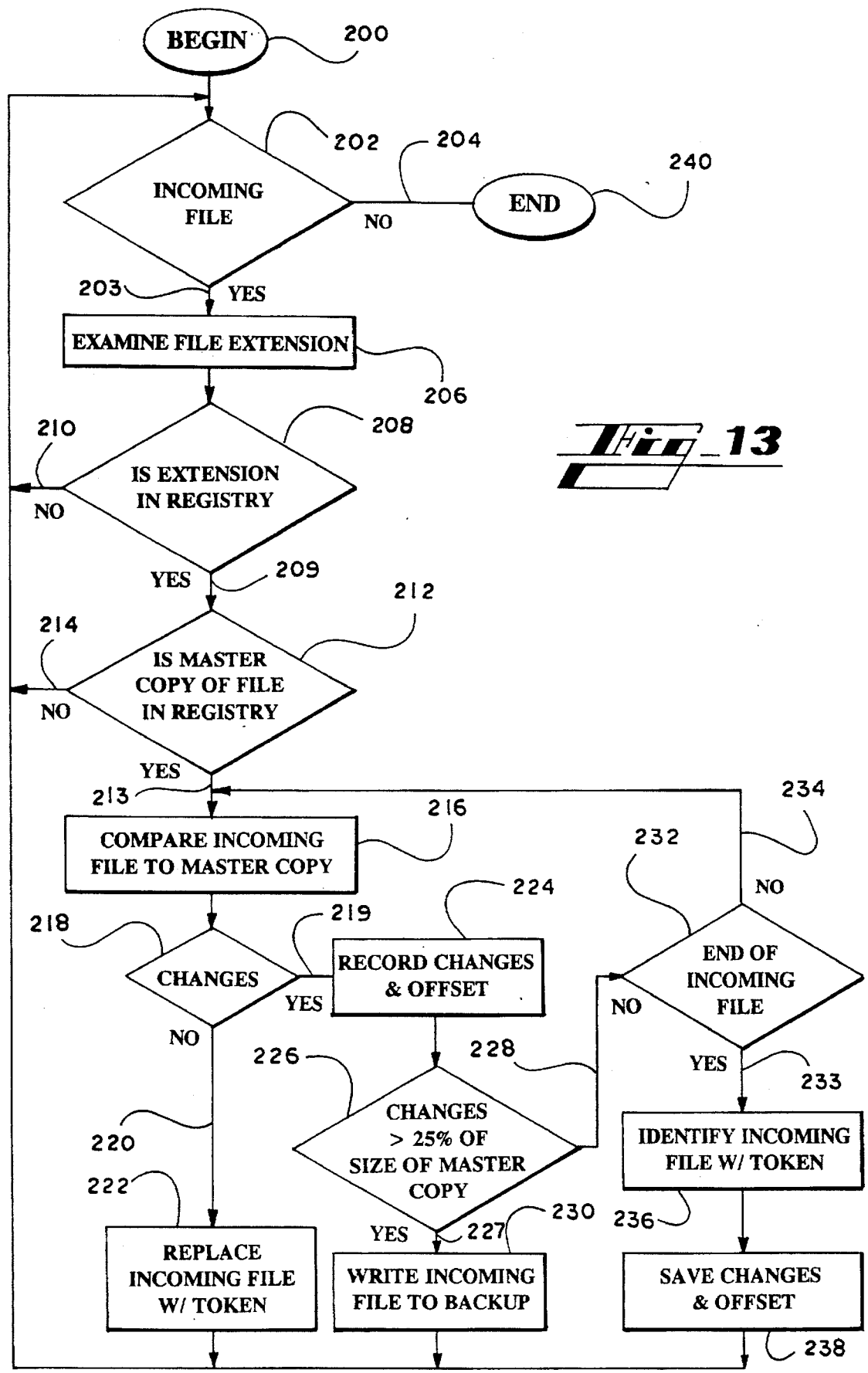

METHOD AND SYSTEM FOR CREATING AND STORING A BACKUP COPY OF FILE DATA STORED ON A COMPUTER

TECHNICAL FIELD

The present invention generally relates to a method and system for transmitting a prioritized, secured backup copy of data from a client site and storing the copy at a backup site, and more specifically relates to a method and system for prioritizing, securing, and reducing the amount of file data that is transmitted and stored during a backup operation.

BACKGROUND OF THE INVENTION

American business has an enormous investment in the information systems stored on its computers. Corporations have created and attempted to maintain disaster recovery systems to deal with disasters or hardware failures on their mainframe computers. However, no comparable protection exists for small businesses or the enormous assets housed on personal computers.

When data stored on a computer is destroyed or lost, the consequences can be disastrous. The data must be reconstructed, which requires great time and expense. In addition, some data may not be able to be adequately or properly reconstructed. Thus, the backup of data stored on computers is a prudent preventive measure to guard against the loss of data.

Data stored on a computer can be lost in many ways. The physical hardware on which the data is stored is susceptible to many types of danger, such as by fire, flood, theft, or any other event that adversely affects the storage medium. Data can also be lost due to failures in the hardware or software associated with the data storage system, such as a hard disk crash. Additionally, the interaction between human users and computers increases the risk of data destruction. Data may be lost in many ways, including mistaken deletion by a user, virus contamination, and tampering.

Therefore, generating a backup copy of the data stored on a computer is a prudent undertaking. However, current methods of generating and maintaining a backup copy of data are imperfect. When backup copies are generated by the user at the client site, the backup operation must be initiated by the user. Such a procedure requires training of the user on the proper way to create a backup. Also, the backup operation is non-automated and thus requires an active procedure on the part of the user that may be forgotten or neglected. Furthermore, physical damage to the computer site, such as that caused by fire, can also destroy the backup media.

Much of the information stored on computer systems consists of relatively static information purchased from outside sources. Examples include operating systems and application programs, as well as other programs such as graphical files, help files, tutorials, etc. Many current backup operations create a copy of the entire contents of the data stored on the computer. Although this method is thorough, it is also inefficient. An enormous amount of space could be saved at the backup site by storing only one master copy of each of these relatively static files rather than storing a separate copy of each identical static file.

Computer file data is stored predominantly on magnetic hard disk drives. Magnetic disk drives include a stack of several rigid aluminum disks, or platters, coated with magnetic material. Each platter has two sides, with each side having an associated read/write device called a head. The head is moveable in a generally radial manner between the outer edge and the inner edge of the disk such that all locations on the disk are accessible.

Each platter is divided into concentric rings called cylinders. Each cylinder is divided into multiple sections called sectors. Each sector on each platter of the hard disk drive has a unique identifier called the Head, Cylinder, Sector (HCS) number. Thus, each sector is identified by a single HCS number and can be independently accessed by moving the head radially to the sector location.

Copying the entire contents of the disk drives of a computer system can be extremely time consuming. Copying all data stored on a computer requires that every sector containing data be accessed and its contents read and then written to a backup copy. This causes unnecessary wear on the mechanical components of the disk drive and increases the time required for the backup operation to complete. Also, many files are maintained by making only relatively small changes to larger existing files. Thus, a backup operation that transmits an entire file stored on a computer actually transmits mostly identical data that previously existed and was transmitted to the backup site during the previous backup operation. Transmitting mostly identical information during a backup operation thus wastes time. A large time savings could be realized by transmitting and storing only the changes made to a previously stored backup file copy.

Furthermore, the vast amount of data to be backed up requires the backup media to include vast storage capacity. Redundant backup systems are often expensive as they require a storage medium of approximately the same size as the storage medium for which backup is desired. Not only does the requirement of adequate storage capacity increase the expense of backup operations, but such an operation requires monitoring by a user to provide additional storage capacity when necessary.

For many prior methods of data backup, the backup copy is created at the client site but stored at an off-site location in order to prevent destruction of both the original data and the backup copy by the same catastrophic event. Thus, the physical transportation of the storage medium on which the backup copy is stored is required from the client site to the backup site, which requires further expense and opportunities for media damage.

Furthermore, certain data contained within a client files may be sensitive and thus must be protected from unauthorized access. Not only must the physical media on which the backup copy is stored be secured against unauthorized access or theft, but the transmission of data from the client site to the backup site should be manipulated such that an unauthorized retrieval of the data will not reveal any confidential data. Therefore, creating backup copies of confidential data actually increases the likelihood that such confidential information may be retrieved by an unauthorized party. Prior methods of data backup do not manipulate the data to be backed up such that any client-sensitive information is specially encoded to prevent unauthorized access.

Thus, the need exists for a method and system for automatically transmitting backup copies of data to a remote backup site for storage. A need also exists for a method and system in which only the changes made to file data since the most recent backup operation are transmitted to the backup site. Furthermore, a need exists for a backup system in which only one copy of large, relatively static files is stored at the backup facility. Finally, a need exists for encoding and encrypting file data transmitted from the client site to the backup site to provide protection against unauthorized access to a client's confidential data.

SUMMARY OF THE INVENTION

The present invention provides a method and system for reducing the amount of data transmitted and stored during the creation of a backup copy of file data of which a previous backup copy has been made. The changed sectors are identified, as are the actual changes made to the sectors. The changed sectors are transmitted to the backup site for storage, while any unchanged sectors are not transmitted. Alternatively, only the actual changes within each changed sector, along with the HCS number and a byte offset identifying the location within the sector at which each change occurs, are transmitted to the backup site rather than the entire sector in which changes occur.

A further alternative prioritizes the files to be transmitted to the backup site. The files are prioritized according to ratings based on predetermined criteria. Higher rated files are transmitted to the backup site prior to lower rated files. Subsequently, data blocks within each file are examined to determine if they are identical to prior data blocks transmitted to the backup site during a previous backup operation. Identical data blocks are replaced by a token that is then transmitted to the backup site. The files that are to be transmitted to the backup site are encoded. All instances of predetermined client-specific data elements within each file are identified. Each identified data element is replaced by a corresponding code prior to encryption.

All files transmitted from the client site to the backup site are encrypted twice. The files are encrypted using multiple, indirect keys, variable block lengths, and variable algorithms method based on a client-selected string of characters. The files are thereafter encrypted again at the client site, prior to transmission to the backup site, using a system-generated second encryption key.

A program registry is maintained at the backup site that contains a master copy of many commercially-available files. Each file that might be contained in the registry is compared to this registry either at the client site, over the transmission channel, or at the backup site. If a file to be backed up is located in the registry, the file is replaced by a token identifying the master copy of the commercially-available file and the token is stored at the backup facility.

Thus, it is an object of the present invention to provide a method and system for providing prioritized, automatic transmission of files from a client site to a remote backup site.

It is a further object of the present invention to provide a method and system for reducing and/or deferring the amount of data transmitted to the backup site during a backup operation.

It is a further object of the present invention to provide a method and system for reducing the time required for a backup operation to complete.

It is yet another object of the present invention to provide a method and system for reducing the storage capacity required at the backup facility.

It is another object of the present invention to provide a method and system for providing multiple layers of security, thereby reducing the possibility of compromise of client information both during the transmission process and at the backup site.

Other objects, features, and advantages of the present invention will become apparent upon reading the following specification, when taken in conjunction with the drawings and the appended claims.

BRIEF DESCRIPTION OF THE DRAWINGS

FIG. 2 is a flow chart showing all procedures used in the preferred embodiment of the present invention.

FIG. 3 is a flow chart describing the method of identifying and storing the sectors containing changes.

FIG. 8 is a flow chart describing a first method of implementing file change analysis at the backup site.

FIG. 9 is a flow chart describing a second method of implementing file change analysis at the backup site.

FIG. 10 is a flow chart describing the method of creating an encoding data base.

FIG. 11 is a flow chart describing the method of encoding client file data.

FIG. 12 is a flow chart describing the method of encrypting client file data.

FIG. 13 is a flow chart describing the method of implementing the program registry.

DETAILED DESCRIPTION

Turning next to the figures, the method and system of the present invention will now be described in detail. The method of the present invention implements a backup system in which file data, stored on a user-maintained client computer, is copied to a backup storage device at a remote backup facility.

In the preferred embodiment of the present invention, the system provides automatic, backup data storage at a remote facility by transmitting only the actual changes made to existing data, rather than the entire contents of the local computer. The following discussion refers to data stored on a magnetic hard disk, however, the present invention can function equally well with other forms of storage, such as CD-ROM, magneto-optical, or solid state electronic storage.

As will be understood from the description below, the advantages gained by the described method and system include a reduction in the amount of data that is transmitted from a client site to the backup site during a backup operation. The reduction of transmitted data reduces the amount of time required for the backup operation to be completed and also reduces mechanical wear and tear of the data storage media at the client and backup sites. Moreover, the reduction in the amount of data transmitted to the backup site correspondingly reduces the data storage capacity requirements at the backup site. This allows the backup computer to utilize a smaller data storage medium, thus reducing the cost of the backup system.

A very high degree of security is provided to client data. Even in the event of multiple compromises of the security codes, including compromise of the client key, a significant compromise of client data is prevented.

System Overview

Figure 1:
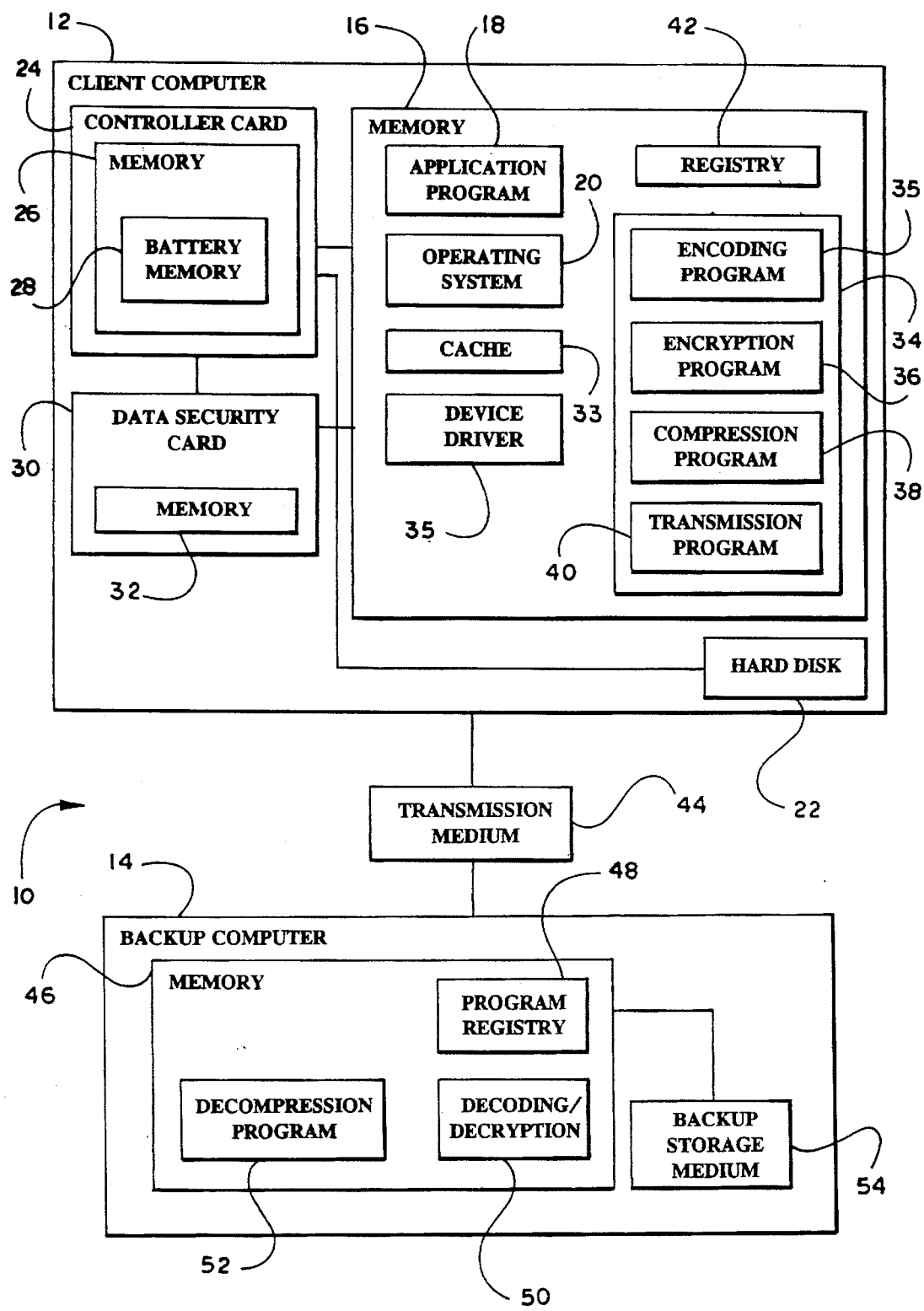
FIG. 1 is a block diagram of a computer system utilizing the present invention.

Turning to FIG. 1, the method of the present invention is implemented on a backup system, generally shown at 10, comprising a client computer 12 and a backup computer 14 located at the remote backup site. The client computer 12 contains the data that is to be backed up. The client computer includes a memory 16 that may include an application program 18 and an operating system 20. The client computer also includes a hard disk 22 on which the client files are stored. It should be understood that the storage of data can be accommodated by any other storage medium, and the implementation of the present invention is not limited by the medium of storage used by the client computer.

The client computer also includes a hard disk controller card 24. The controller card includes a memory 26, at least a portion of which may be battery powered memory 28. The client computer also includes a data security card 30 that includes a memory 32, at least a portion of which may be battery powered memory.

Within the memory 16 of the client computer 12 is a cache 33 and a device driver 35, both connected to the controller card 24. The memory 16 also includes backup programming 34 to implement features of the present invention. This backup programming 34 includes an encoding program 35, an encryption program 36, a compression program 38, and a transmission program 40. Also stored within the memory 16 of the client computer 12 is a registry 42 containing a list of generally commercially-created files.

The data to be backed up is transferred via a transmission medium 44 to a backup computer 14 at the remote backup site. The backup computer 14 includes a memory 46 that includes a program registry 48 that stores a list of many commonly used, commercially available programs. Also included within the memory 46 of the backup computer 14 is a decoding and decryption program 50 and a decompression program 52. The client files to be backed up are stored on a backup storage medium 54, preferably comprising a magnetic hard disk.

Method Overview

The method for implementing the present invention is shown in FIG. 2. The invention utilizes one of three alternative methods for identifying changes that have been made to data.

The first alternative method, identified at 62, uses a hard disk controller card that maintains a first table for identifying the sectors that contain changed data. The entire contents of each sector identified in the first table as containing changed data are subsequently processed and transmitted to the backup site. Thus, only those sectors containing changed data are transmitted, and the contents of all unchanged sectors are not transmitted.

The second alternative method, identified at 64, for identifying changes utilizes the hard disk controller card to maintain a second table that identifies the HCS number of the sector in which changes occur and records the actual changes and the change's locations within each changed sector. The contents of the second table are subsequently processed and transmitted to the backup site. Thus, only the actual changed data, and certain identifying information, is transmitted, rather than the entire contents of a sector containing changed data.

The third alternative method utilizes a file value/channel capacity analysis, identified at 66. The file value/channel capacity analysis prioritizes the files to be transmitted to the backup site. The highest priority files are selected for transmission to the backup site, and the lower priority files are selected for subsequent transmission. A file change analysis, identified at 68, in which data blocks of predetermined size within files are analyzed for any changes and whereby each unchanged data block is represented by a respective token, is then employed. Thus, only those data blocks containing changes, along with the tokens representing unchanged data blocks, are transmitted to the backup site. A unique encoding system, identified at 70, is then employed for encoding client-sensitive data within each file.

It should be understood that these three alternative methods for identifying changed data are mutually exclusive and are implemented independently.

The present invention includes a double encryption process, identified at 71. The first level of encryption uses multiple, indirect encryption keys, variable block lengths, and variable algorithms based on a client-selected string of characters, thus adding an extra level of security to the transmission of client files. The second level of encryption is generated by the transmission system. The encryption process 71 employs indirect encryption keys, based on a client-selected key, to perform the actual encryption of data. Thus, the compromise of the client key does not guarantee the decrypting of client data as the actual encryption and decryption is not performed using the client key, but rather is performed using a key derived from the client key.

After the transmission of files to the backup site identified at 72, the invented system and method preferably provides a program registry, identified at 74, that compares the incoming files to a list of master copies of files maintained at the backup site. These master copies may include commercially-available application programs and client-customized versions thereof. Incoming files that are identical or similar to the master copy are stored at the backup site, identified at 76, as a token identifying the file, along with any changes to the incoming file. This allows the backup site to store each duplicate file as a mere token, thus saving time and storage space at the backup storage medium. This is particularly useful in situations in which multiple copies of a standard application program are stored on various computers at a client site.

It should be understood that the various methods and systems provided by the present invention as shown in FIG. 2 need not necessarily be implemented together. The methods and systems of the present invention can be used independently of any other feature of the invention, and the description in FIG. 2 of all features of the preferred embodiment of the invention in simultaneous use is provided for the sake of completeness. It will be seen from the description of the embodiments of the present invention below that each feature can be implemented independently in conjunction with a method and system for transmitting and storing backup copies of files at a remote site.

HCS Table

As seen in FIG. 1, the client computer 12 on which the new data is stored includes a hard disk controller card 24. The controller card, in accordance with the present invention, is connected to the hard disk 22 and receives commands from the operating system 20 of the client computer. The controller card commands the hard disk to execute the commands issued by the operating system. When data is to be written to the hard disk, the application program 18 gives the operating system 20 a command to write the data to the hard disk 22. The operating system passes the data to be written to the hard disk controller card 24 along with an HCS number. The HCS number identifies the sector on the hard disk in which the data is to be written.

The method of identifying the sectors in which changes have been made since the last backup operation, as shown in FIG. 2 at 62, is shown in further detail in the flow chart of FIG. 3. The method begins at 100. At step 102, it is determined whether the application program has commanded the operating system to write data to the hard disk. If so, the method follows "yes" branch 103 to step 104. At step 104, the operating system passes the data and the HCS number to the controller card, designating the sector on the hard disk at which to write the data.

The hard disk controller card maintains in its memory an HCS table of all HCS numbers for the hard disk to which the controller card is connected. For each HCS number stored in the table, a digital entry is stored. The entry is stored as a "1" if the sector on the hard disk identified by the HCS number is to be, or has been, written to. If a sector identified by an HCS number has not-been written to since the last back-up operation, the entry in the HCS table for the particular HCS number is "0". Thus, the controller card keeps track of all sectors on the hard disk, as identified by their HCS numbers, that have been written to. In this embodiment of the present invention, the hard disk controller card views each write operation to a sector as making changes to the data in the sector, although it is understood that each write operation does not necessarily make changes to all existing sector data.

At step 106, the controller card changes the entry associated with the particular HCS number for which data is to be written to "1". The method then proceeds to step 108, where it is determined whether the device driver has been issued a DUMP command. A software program will, upon command or at a preset time, command the device driver, identified at 35 in FIG. 1, associated with the controller card to issue a DUMP command to transfer the contents of the HCS table to a file on the hard disk. If the program issues a DUMP command to the device driver, the method follows "yes" branch 109 to step 112, where the device driver issues the DUMP command to the controller card. If the device driver has not been issued a DUMP command, the method returns to step 102 via "no" branch 110. After the DUMP command has been issued to the controller card, the card writes the contents of the HCS table to the hard disk 22. The contents of the changed sectors identified by the HCS table are subsequently transmitted to the backup site. After the changed sectors are transmitted and stored at the backup site during the backup operation, each entry in the HCS table is reset to "0" to indicate that each sector identified in the HCS table has not been changed.

Thus, when a back-up operation is commanded or initiated, normally at a predetermined time, the only information that is copied to the backup site are the contents of the sectors identified in the HCS table as having a value of "1". This occurs only when a prior backup has previously occurred such that information previously copied to the remote site is known. If no prior backup has occurs, the entire content of the hard disk drive must be copied to the remote site.

By copying only sectors that are identified by the HCS table as containing changed data, the contents of unchanged sectors are not copied. This saves time because the backup site already includes a backup copy of the unchanged sectors and transmitting another copy of the unchanged sectors is unnecessary, wastes time, and causes wear and tear on the mechanical components of the hard disk drive.

HCS Table and the Changed Data Area

The above method of reducing the amount of data transmitted to the backup site during a backup operation is further enhanced by transmitting only the actual changes within each sector, rather than the entire sector that includes changed data. This is accomplished in the following manner.

Another embodiment of the hard disk controller card includes the HCS table described above and further includes another table stored in the memory of the controller card called the Changed Data Area (CDA).

Figure 4:
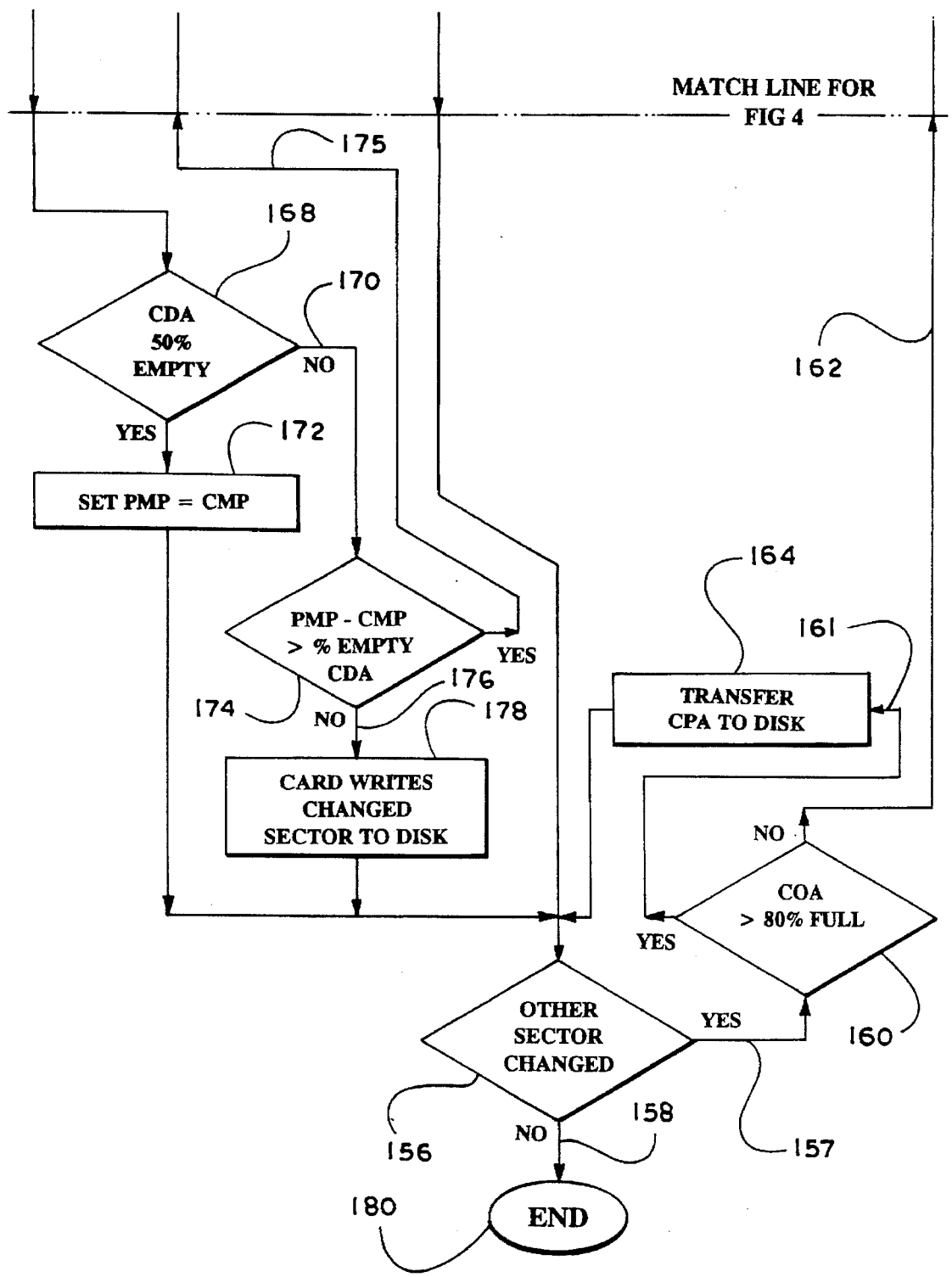
FIG. 4 is a flow chart describing the method of identifying and storing the changes made to a sector.

The method, shown in FIG. 2 at 64, is further described in FIG. 4. The process begins at 120. At step 121, it is determined whether the application program has commanded the operating system to write data to a sector on the disk. If so, the method follows "yes" branch 122 to step 124. If the application has not commanded the operating system to write data, the method follows "no" brach 123 and the method terminates at 180.

At step 124, the operating system passes the command to the controller card to write new data to a sector. At step 126, the controller card reads the old data stored in the sector and retains the old data in the cache, identified at 33 in FIG. 1. The controller card then passes the old data of the sector to the operating system at step 128. At step 130, the operating system makes the changes to the old sector and passes the new data back to the controller card to be written to the hard disk.

The controller card maintains in its memory a Changed Data Area (CDA) in which the changes made to each sector are stored. The HCS number of the changed sector, the actual changes made within the sector, and the location of the changed data identified by a byte offset from the beginning of the sector, are stored in the CDA. The hard disk controller card also stores two pointers: a prior memory pointer (PMP) and a current memory pointer (CMP). These variables point to memory addresses within the CDA. After a change is identified, and the HCS number, byte offset, and actual changed data are stored in the CDA, the controller card stores the memory address of the last byte of the new data as the CMP. Then, the controller card continues comparing the new data and the old data. If another change is identified, the controller card stores another HCS number, byte offset, and changed data. The controller card then updates the CMP to store the memory address of the last byte of the most recently stored data in the CDA. The controller card continues this process until all new data to be written to the sector has been compared to the old data in the sector stored in the cache area.

For each sector write, the PMP identifies the memory address in the CDA at which changes begin. As described above, the CMP identifies the memory address in the CDA of the last byte of changed data. When the CDA is empty, the PMP is set at the beginning of the CDA. When the CDA is partially full, the PMP is set at the end of the changes stored for a previous sector write.

At step 132, the controller card conducts a byte-by-byte comparison of the new sector data received from the operating system to the old sector data stored in the cache. If a byte has been changed, as determined at step 134, the method follows "yes" branch 135 to step 140. If the byte has not changed, the method follows "no" brach 136 to step 142.

If the byte under comparison has been changed, the HCS number of the sector, the actual changed data, and the location of the changed data in the sector in the form of a byte offset from the beginning of the sector, are stored in the CDA at step 140. At step 141, the CMP in the CDA is updated to the location of the changed byte.

Step 142 determines whether there are other bytes within the sector under examination. If there are other bytes within the sector, the method follows "yes" branch 143 and returns to step 132 where the byte is compared to the byte stored in the cache. If no other bytes are in the sector, meaning that all bytes within the new sector have been compared to the sector in the cache, the method follows "no" branch 144 to step 146.

Step 146 determines whether the number of bytes between the PMP and the CMP exceeds a predetermined amount. Preferably, the predetermined amount is set equal to one half of the number of bytes in a sector, although other threshold amounts may be utilized. All sectors on a given disk are the same size and are capable of storing an equivalent number of bytes, therefore, the preferred predetermined amount of one half the number of bytes in a sector can be identified with particularity. If the difference between the PMP and the CMP is more than one half a sector size, the method follows "yes" branch 147 to step 150.

At step 150, the controller card changes the entry for the HCS number of the sector to "1" to signify that the data stored within the sector has changed. The changes to the sector stored within the CDA are then discarded at step 152 and the CMP is reset to the location of the PMP at step 154. The method then proceeds to step 156 where it is determined whether there are other changes to data stored within the sector. The discarding of the changes in the CDA is performed because the changes to the sector are large (consuming over one half the number of bytes in the sector) and thus it is more efficient to transmit the entire sector rather than the many changes within the sector. The goal of using the method described in the flow chart of FIG. 4 is to store only relatively small changes in the CDA, while large changes are not stored in the CDA. The entire sector in which large changes occur, as identified by the HCS table value of "1" for that sector, will be transmitted to the backup site.

If the difference between the PMP and CMP is less than one-half the size of a sector, as determined at step 146, the method follows "no" branch 148 to step 166, where the percentage of the CDA that is empty is determined. This is determined by subtracting the size of the CDA that is in use, as determined by the difference between the location of the CMP and the beginning of the CDA, from the overall size of the CDA. If the CDA is over half empty, as determined at step 168, the method follows "yes" branch 169 to step 172, where the PMP is updated to be set at the location of the CMP. This allows the PMP to be set at the beginning of the changes to a subsequent sector being examined. The method then proceeds to step 156.

If the CDA is not over half empty, as determined at step 168, the method follows "no" branch 170 to step 174. Step 174 determines whether the difference between the CMP and the PMP exceeds the empty space in the CDA. If so, the method follows "yes" branch 175 to step 150. If the difference between the CMP and the PMP is less than the remaining empty space in the CDA, the method follows "no" branch 176 to step 178, where the controller card writes the entire sector that contains changed data to the hard disk. The method then proceeds to step 156.

At step 156, it is determined whether another sector has been changed. If not, the method follows "no" branch 158 and the method terminates at 180. If another sector includes changes, the method follows "yes" branch 157 to step 160. Step 160 determines whether a threshold percentage of the size of the CDA is being used to store changes. Preferably, the threshold percentage is 80 percent, although other threshold percentages can be utilized. If the CDA is over 80 percent full, the controller card transmits a message to the device driver. The device driver causes the contents of the CDA to be transferred to the hard disk and the contents of the CDA on the controller card are deleted. A controller program is specially designed to work with the device driver to download information from the controller card to the hard disk. The device driver monitors the controller card for messages to determine if the controller program should issue a DUMP command.

If the CDA is over 80 percent full, the method follows "yes" branch 161 to step 164, where the controller card transfers the contents of the CDA to the hard disk. The method then proceeds to step 156. If the CDA is not over 80 percent full, the method follows "no" branch 162 to step 132, where byte-by-byte comparisons of data from the new sector and the data from the old sector stored in the cache are performed.

Subsequently, the contents of the CDA and any CDA table data stored on the hard disk are transmitted to the backup site. By copying to the backup site only the actual changes to a sector identified in the CDA, all unchanged data is not copied. This is the most efficient manner in which changes can be transferred to the backup site because the data backed up is exclusively new data. This method is desirable because the remote site already includes a backup copy of the unchanged data and transmitting another copy of the unchanged data is unnecessary, wastes time, and causes wear and tear on the mechanical components of the hard disk drive.

File Value/Channel Capacity Analysis

The backup system of the present invention includes a file value/channel capacity analysis for transmitting files from the client site to the backup site in a sequence based on the priority of the files and the capacity of the transmission medium. The files to be backed up are assessed to determine their rating, i.e., the level of priority. Among the factors used to determine a file's rating are whether the file is unique to the site, whether the file has been previously backed up, how recently the file was created, the size of the file, and the density of information within the file. In general, the more unique, the more recently a file has been created, the larger the size, and the more dense the information contained within a file, the higher the rating of the file. The method prioritizes the transmission of files such that groups of higher rated files are transmitted to the backup site prior to lower rated files.

Figure 5:
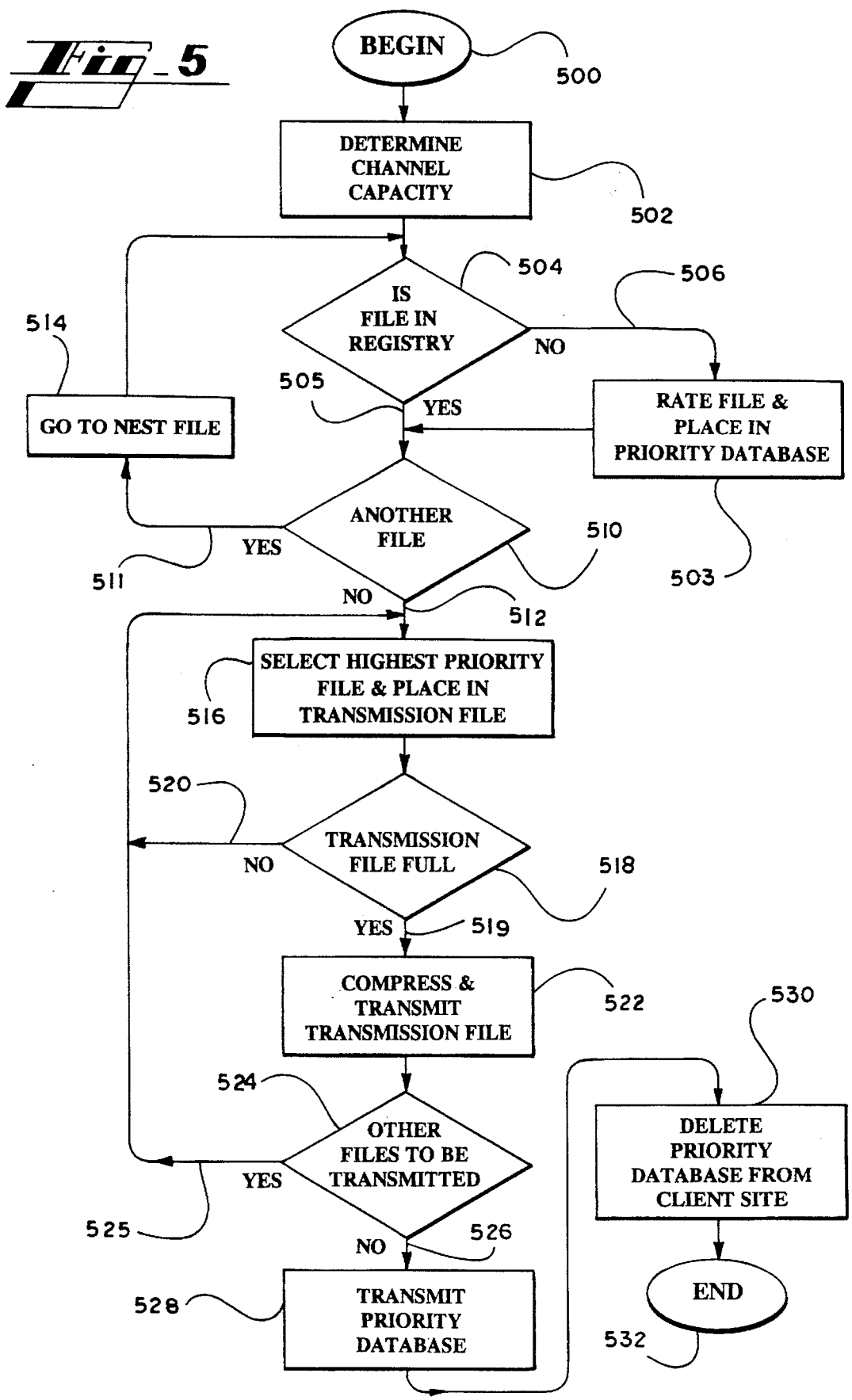
FIG. 5 is a flow chart describing a first method of implementing file value/channel capacity analysis.

The method of implementing the file value/channel capacity analysis, shown in FIG. 3 at 66, is further described in FIG. 5. The method begins at 500. At step 502, the transmission channel capacity is determined. Channel capacity is the transmission rate multiplied by the available transmission time. Transmission rate is normally determined by the physical channel available. For instance, common analog modem speeds include 2400, 9600, 14,400, and 28,800 bits per second. However, circumstances may exist where the transmission rate is set at a rate lower than the physical capacity of the channel. Available transmission time can be set in several ways including a default value, a client-determined value, and a value transmitted by the backup site to the client site.

At step 504, the client file is analyzed to determine whether the file is included in a client registry, identified in FIG. 1 at 42. The client registry maintains a list of files that are not unique to the client site. Such a list includes commercially available programs, because such programs do not contain data that is unique to the client. If the file is included in the registry, the method follows "yes" branch 505 to step 510. If the file is not included in the registry, the method follows "no" branch 506 to step 508, where the file is rated and placed in a priority data base. The rating in indicative of the priority to be given to the file regarding backup operations. Thus, a file that is rated higher than another file will be given priority, i.e., the higher rated file will be transmitted to the backup site prior to the lower rated file. The value of a file, and thus the higher rating, may depend on the uniqueness of the file to the client site, the protection status of the file, i.e., whether previous backups have been completed for the file, the time of the most recent backup, the size of the file, and the density of the information within the file. The uniqueness of a file is determined by the registry. A registry maintained at the client site determines whether the file is unique to that site or is commercially available. Each file to be backed up is compared to the registry at the client site to determine whether the file to be backed up is contained within the registry. If the file is contained within the registry, it is deemed to be non-unique.

After the file is rated and placed in the priority data base at step 508, the method proceeds to step 510 where it is determined whether other files to be backed up have been rated. If so, the method follows "yes" branch 511 to step 514 where the next file is selected and the method returns to step 504. If no other files are to be rated, the method follows "no" branch 512.

After all files to be transmitted to the backup site have been rated and prioritized, the compression program analyzes the ratings of all files and then determines which files are to be transmitted to the backup site prior to other files. There are three alternative methods of creating and implementing a transmission priority.

The first alternative method of creating a transmission priority data base is shown in FIG. 12. "No" branch 512 leads to step 516, where the system selects the highest rated file available from among the group of flies to be transmitted and places that file in the transmission file. The transmission file is a file of finite size determined by the channel capacity analysis of step 502 such that less than all the files to be transmitted may fit within the transmission file. When backup transmissions are desired, the contents of the transmission file are transmitted to the backup site. Only files within the transmission file are transmitted to the backup site. Thus, when the transmission file is full, no other files may be transmitted to the backup site until the contents of the transmission file have been transmitted to the backup site.

At step 518, it is determined whether the transmission file is full. If not, the system follows "no" branch 520 and returns to step 516 to again select the highest rated file available and place the file in the transmission file. If the transmission file is full, the method follows "yes" branch 519 to step 522, where the contents of the transmission file are compressed and transmitted to the backup site. It should be understood that prior to transmission to the backup site the files in the transmission file undergo file change analysis, encoding, and encryption, identified in FIG. 2 at 68, 70, and 71 respectively. After the transmission file is transmitted to the backup site, step 524 determines whether other files at the client site that were not transmitted are to be backed up. If so, the method follows "yes" branch 525 and return to step 516, where the transmission file is again filled with the highest rated files and transmitted to the backup site. If all files to be backed up have been transmitted, the method follows "no" branch 526 to step 528, where the priority data base itself is transmitted and then deleted from the client site at step 530. The method then terminates at 532. It should be understood that this process normally occurs at a time when the transmission channel has no other traffic.

Figure 6:
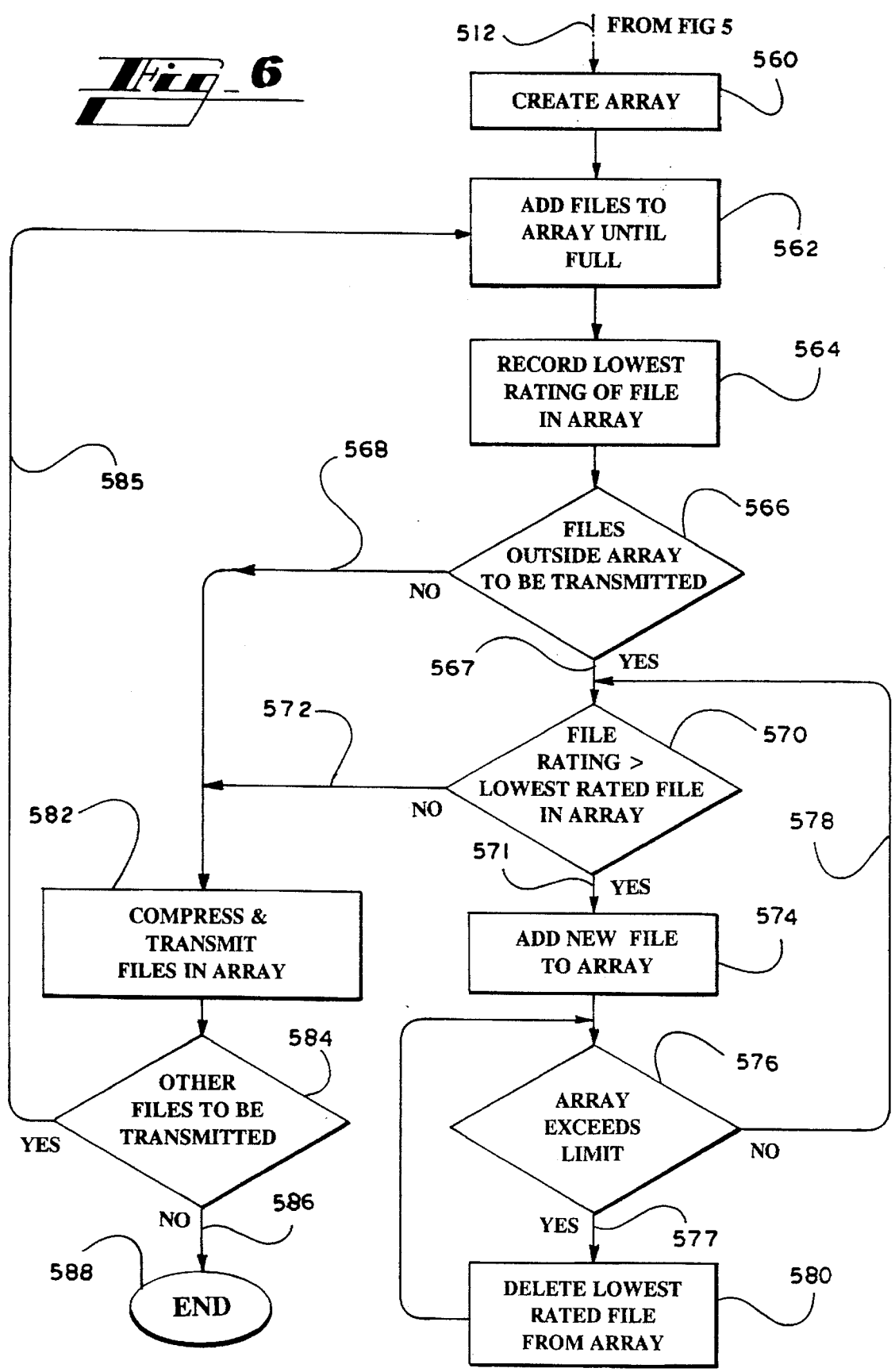
FIG. 6 is a flow chart describing a second method of implementing file value/channel capacity analysis.

The second alternative method of creating a transmission priority data base is described in FIG. 6. The method follows "no" branch 512 to step 560, where a priority array is created. At step 562, files to be backed up are added to the array until the array is full. The combined size of the files contained in the array is limited by the channel capacity. The files that are initially added to the array are not done so on the basis of priority ratings. When the array is full, the rating of the lowest rated file in the array is recorded at step 564. If there are additional files not included within the array that are to be transmitted to the backup site, as determined at step 566, the method follows "yes" branch 567 to step 570, If no additional files outside the array are to be transmitted, the method follows "no" branch 568 to step 582, where the contents of the array are compressed and transmitted to the backup site. It should be understood that prior to transmission to the backup site the files in the transmission file undergo file change analysis, encoding, and encryption, identified in FIG. 2 at 68, 70, and 71 respectively.

At step 570, it is determined whether a file outside the array has a priority rating that is higher than the lowest rated file in the array. If not, the method follows "no" branch 572 to step 582. If a file outside the array has a higher priority rating than the lowest rated file in the array, the method follows "yes" branch 571 to step 574, where the file is added to the array. If the array exceeds its capacity, as determined at step 576, the method follows "yes" branch 577 to step 580, where the lowest rated file in the array is deleted from the array. The method then returns to step 576. If the contents of the array still exceed the array's capacity, additional low rated files are deleted from the array until combined size of files in the array is equal to or below the capacity of the array. If step 576 determines that the array does not exceed its capacity, the method follows "no" branch 578 and returns to step 570.

Thus, it should be understood that each file to be transmitted is compared to the lowest rated file in the priority array. After all files are compared and the appropriate files added to or deleted from the array, the files remaining in the array will have ratings such that each file in the array will have a higher rating than each file outside the array. After all files outside the array have been analyzed, the contents of the array are compressed and transmitted to the backup site at step 582. Thus, each transmission of the files contained in the array ensures that the highest priority files are transmitted before the lower priority files.

If additional files are to be backed up, as determined at step 584, the method follows "yes" branch 585 and returns to step 562, where the array is again filled with files. If no other files are to backed up, the method follows "no" branch 586 and terminates at 588. Thus, after the contents of the array have been transmitted to the backup site, the process begins again and files that were not contained in the array, and thus not transmitted, are added to the array. The comparison process begins again and when all remaining files have been examined, the contents of the array are again compressed and transmitted to the backup site. The process of adding files to the array, comparing new files to the lowest rated file in the array, adding files to the array and deleting the lowest rated files from the array, and then transmitting the files in the array to the backup site continues until all files have been transmitted.

File Change Analysis

An alternative embodiment of the present invention utilizes a file change analysis (FCA) instead of identifying and storing the changes made to a sector in tables in the hard disk controller cards as described above. Generally, file change analysis reduces the amount of data that is transmitted from the client site to the backup site by identifying identical data blocks and transmitting a token identifying the data block in place of the data blocks themselves. If the data block is identical to a data block that was transmitted to the backup site during the previous backup operation, the data block is identified by a token. If the data block is not identical to the data block of the previous backup operation, the actual data of the data block is transmitted to the backup facility. At the backup facility, the actual data of the data block corresponding to the token is retrieved from the master copy at the backup site and substituted for the token. Thus, the file is recreated as it exists at the client site and is stored at the backup site.

Figure 7:
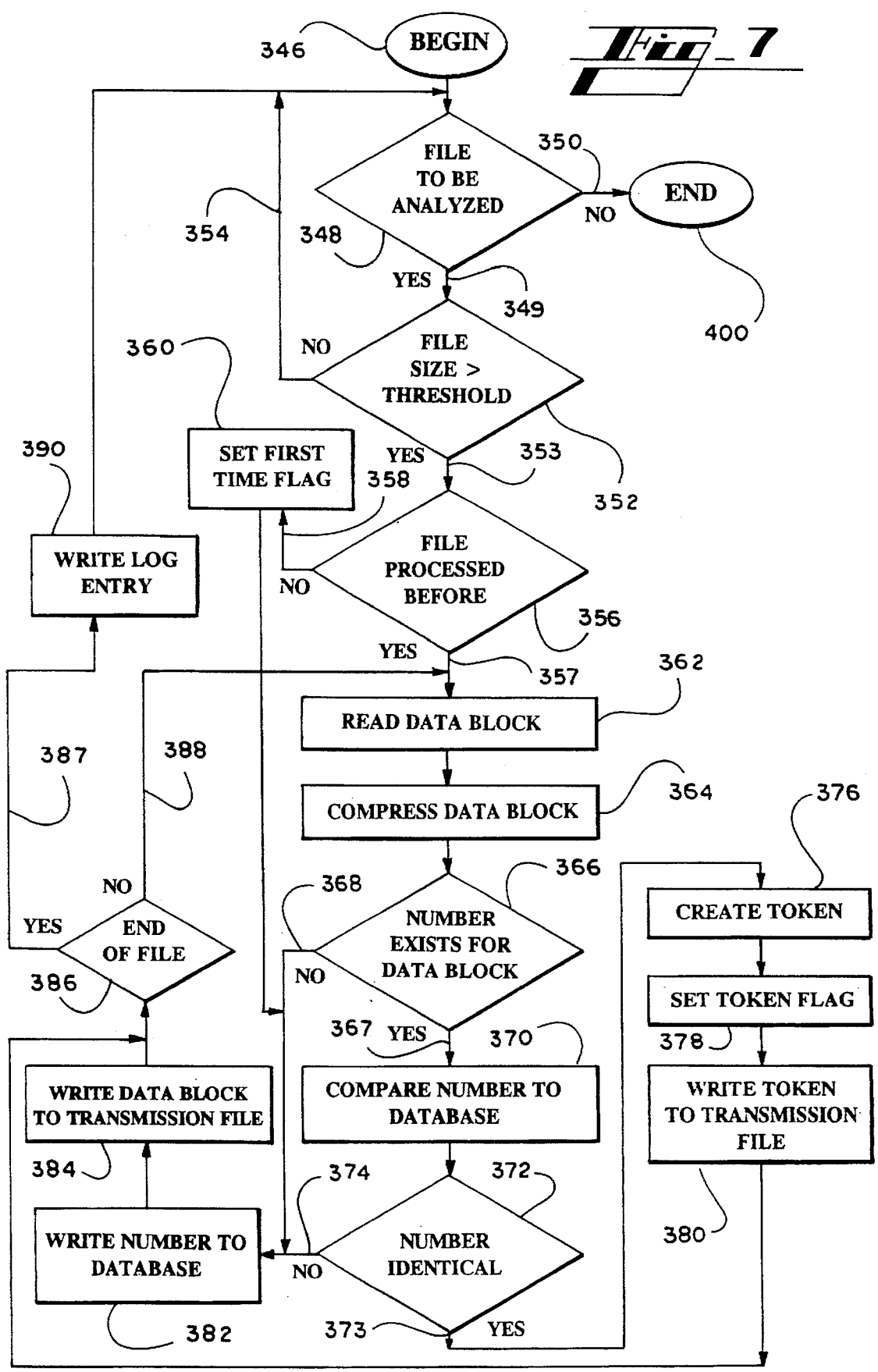
FIG. 7 is a flow chart describing the method of implementing file change analysis at the client site.

The implementation of file change analysis at the client site, shown in FIG. 2 at 68, is further described in the flow chart of FIG. 7. The method begins at 346. Step 348 determines whether a file is to be analyzed. If no file is to be analyzed, the method follows "no" branch 350 and the method terminates at 400. If a file is to be analyzed, the method follows "yes" branch 349 to step 352, where the size of the file to be analyzed is compared to a predetermined threshold. If the size exceeds the threshold, the method follows "yes" branch 353 to step 356. If the size of the file does not exceed the threshold, the method follows "no" branch 354 and returns to step 348. Thus, file change analysis in accordance with the present invention is performed only on files exceeding a predetermined size.

Step 356 determines whether the file being analyzed has been previously analyzed, i.e., whether the file has been transmitted to the backup site during a previous backup operation. If so, the method follows "yes" branch 357 to step 362. If the file has not been previously analyzed, the method follows "no" branch 358 to step 360 where the "first time" flag is set. The method then proceeds to step 382.

At step 362, a data block comprising a predetermined amount of data is read from the file. At step 364, the data block is compressed by a compression program. When file change analysis is utilized, in accordance with an embodiment of the present invention, a number is generated by the compression program during compression of each data block. The number that is generated is dependent on the content of the data block such that a unique number will be generated for each different data block. Conversely, identical numbers will be generated for identical data blocks. The compression program maintains a data base of numbers generated for data blocks that have been transmitted to the backup site during a previous backup operation.

At step 366, it is determined whether a number exists for the data block. If a number does not exist for the data block, the method follows "no" branch 368 to step 382. If a number does exist for the data block, the method follows "yes" branch 367 to step 370, where the number generated by the compression program for the data block is compared to the number stored in the data base maintained by the compression program. If the numbers are not identical (meaning the data block has not been previously transmitted to the backup site or the data block contains changed data), or the first time flag is set (meaning that the file has not been previously transmitted to the backup site) the number is written to the data base and the compressed data of the data block is written to the transmission file for subsequent transmission to the backup site.

If the numbers are identical, as determined at step 372, then it is determined that the data block has been transmitted to the backup site during a previous backup operation. The method follows "yes" branch 373 to step 376, where a token is created associated with the number and the data block.

The token merely indicates that the particular data block being analyzed has been previously transmitted to the backup site. The token does not represent actual bytes of data as does the token used when storing flies contained in the registry. The token, as used in the FCA method of file backup, is used to signify that the data in the data block has previously been stored at the backup site and thus need not be transmitted during the current backup operation. This reduces the amount of data that must be transmitted during a backup operation and thus increases efficiency.

At step 378, the token flag is set. The setting of the token flag signifies that file change analysis has been used for the data block of the file. At step 380, the token is written to the transmission file. The method then proceeds to step 386.

If the number of the data block is not identical to a number stored in the data base, the method follows "no" branch 374 to step 382. At step 382, the number for the data block is written to the data base to signify that the data block will be transmitted to the backup site such that the number corresponding to the data block can be used during subsequent implementations of file change analysis. Then, at step 384, the data block itself is written to the transmission file. The method then proceeds to step 386.

At step 386, it is determined whether the end of the file being analyzed has been reached. If not, the method follows "no" branch 388 and returns to step 362 to read another data block. If the last data block read constituted the last data block of the file, the method follows "yes" branch 387 to step 390, where an entry for the file is written to the log. A log entry for each file notes whether file change analysis has been employed. The method then returns to step 348 to determine whether a subsequent file is to be analyzed. In this manner, all files are examined to determine whether file change analysis is to be undertaken. After all files have been analyzed, the contents of the transmission file and the log are encoded, encrypted, and transmitted to the remote backup site.

The above method described in FIG. 7 describes the implementation of file change analysis at the client site. The utilization of file change analysis at the remote backup site is described by the flow chart of FIG. 8. The method begins at 420. At step 422, the backup site receives an incoming file and the log for that file transmitted from the client site. At step 424, the log is read. Step 426 determines whether the log entry for the file identifies that the file uses file change analysis. If FCA is not used, the method follows "no" branch 428 to step 434. If FCA is used for the file, the method follows "yes" branch 427 to step 430 where the master copy of the incoming file is read from the backup site. The copy of the master file is stored in a temporary working area at step 432. Step 434 then determines whether further incoming files have been received. If so, the method follows "yes" branch 435 and returns to step 424 where the log for the new file is read. In this manner, the log for each incoming files is read and the master copy of each incoming file is read from the backup site and stored in the working area. If no further incoming files have been received, the method follows "no" branch 436 to step 438.

Files using file change analysis that have been received from the client site are recreated and then stored at the backup site using two alternative methods. The first alternative method begins at step 438, where the backup computer reads a data block from a file received from the client site. If the data block is represented by a token, as determined at step 440, the method follows "yes" branch 441 to step 444, where the data block in the master copy of the file corresponding to the token is written to a new copy of the file that is stored in the temporary working area. If the data block is not represented by a token, the method follows "no" branch 442 to step 446, where the data block from the incoming file is written to the new copy of the file.

At step 448, it is determined whether the data block represents the end of the file. If not, the method follows "no" branch 450 and returns to step 438 to read and process subsequent data blocks from the file. If the end of the file is reached, the method follows "yes" branch 449 to step 452, where it is determined if all files in the transmission file have been processed. If the end of the transmission file has not been reached, the method follows "no" branch 454 and returns to step 438. If the end of the transmission file is reached, the method follows "yes" branch 453 to step 456. Thus, it is seen that all data blocks of each file in the transmission file are read and processed such that each file is represented by a respective new copy of the file.

At step 456 and 458, the new copy of each file is compressed and written to the backup storage medium at the backup site. The writing of the new copies of the files at step 458 replaces the master copy of the files at the backup site. The process then terminates at 460.

The second alternative method of reading and processing the data blocks of each incoming file is shown in FIG. 9 at steps 472 through 476. The method of FIG. 9 proceeds as the method of FIG. 8 through step 438. In the alternative method herein described, the method proceeds to step 472, where it is determined whether the data block is represented by a token. If so, the method follows "yes" branch 473 to step 448, shown in FIG. 8. If the data block is not represented by a token, the method follows "no" branch 474 to step 476, where the data block is written directly to the appropriate location in the master copy of the file at the backup site. The method then proceeds to step 448.

Thus, it is seen that the alternative method described above leaves the data in the master copy intact if the data block is identified by a token in the incoming transmission file and writes the data to the master copy if the data block is not represented by a token, designating that the data has been changed since the last backup operation.

Encoding

The present invention for providing a backup system includes multiple levels of security that protect the confidentiality of the client data being backed up. The system provides adaptive encoding of key elements of backed up data by identifying and replacing predetermined client-specific data with codes prior to encryption. The encoding procedure of the present invention prevents undesirable disclosure of the data if an unauthorized access of client files is obtained.

The encoding process, shown in FIG. 2 at 70, is further described in the flow chart of FIG. 10, and begins at 260. Step 262 determines whether a file is to be examined. If not, the method follows "no" branch 264 and the method of encoding terminates at 277. If a file is to be examined, the method follows "yes" branch 263 to step 266, where it is determined whether the file being examined is the encoding type. A registry, identified at 42 in FIG. 1, contains a list of non-codable files, i.e., files that have not been created by the client and therefore do not contain client-sensitive information. Files that are commercially available and that do not contain confidential client information are generally contained within the registry. If a file is not found within the registry, it is deemed an encoding type of file, i.e., a file that contains client-sensitive information. Static, commercial files are generally not deemed to be the encoding type.

If the file being examined is not an encoding type file, as determined by comparing the file to the registry at step 266, the method follows "no" branch 268 and returns to step 262 to examine subsequent files. If the file is an encoding type file, the method follows "yes" branch 267 to step 270, where the file data is read. All codable elements within the file are identified at step 272. Codable elements are data elements that are client-sensitive and may include proper names, prepositional phrases, file headers, or any confidential data. Data elements that are to be identified as codable are selected by the client and stored in a data base at the client site. All instances of codable data elements are identified and the number of occurrences of each codable data element are recorded.

At step 274, the system passes the codable elements and their corresponding codes, preferably comprising random numbers, to the memory of a data security card in the client computer, where they are maintained in a code data base. At step 276, the system assigns respective codes to the codable elements in the file that occur with a predetermined frequency. The method then returns to step 262 to determine if another file is to be examined.

The above method of FIG. 10 describes the process of creating the data base of codes in the memory of the data security card. The process of substituting the codes for the codable data elements within each file is described in FIG. 11. The method begins at 278. At step 279, it is determined whether a file is to be encoded. If not, the method follows "no" branch 281 and the encoding terminates at 304. If the file is to be encoded, the method follows "yes" branch 280 to step 282, where the file data is read. At step 284, it is determined whether a codable data element exists in the file. If a codable data element exists, the method follows "yes" branch 285 to step 288 where the data security card transfers the corresponding code obtained from the code data base to the system. Thereafter, the compression program that compresses data to be transmitted to the backup site substitutes the code for the respective codable data element at step 290. The method then proceeds to step 292 to determine whether the entire file has been examined. If the end of the file has not been reached, the method follows "no" branch 294 and returns to step 284 where the search for codable data elements in the file continues. If the end of the file has been reached, the method follows "yes" branch 293 and returns to step 279, where it is determined whether a subsequent file is to be examined for codable data elements.

If the file data being examined contains no codable data elements, as contained in the code data base on the data security card, the method follows "no" branch 286 to step 296, where the data security card transfers an error code to the system. The file data that does not include a codable element is left intact in the compression program at step 298 and is not substituted therefore with a code. The method then proceeds to step 292.

When all files have been examined and encoded as necessary, the encoding method terminates at 304.

Encryption

The encryption of the files to be transmitted follows the encoding procedure. The encryption method, shown in FIG. 2 at 71, is further described in FIG. 12.

After the file data to be backed up has been determined as described above, the file data is encrypted twice. The first level of encryption is based on a client key derived from a client-selected string of characters. The actual encryption keys used to encrypt the data are derived from the client key, thus creating a system of indirect encryption keys. The encryption keys are derived systematically by the computer system from the original client-selected key, but the derivation process is not available to one attempting to compromise the system without access to other elements of the computer system that are separately and independently secured. The keys used to actually encrypt the data are changed at random intervals determined by the random numbers created by this process. The second encryption is performed by the transmission program based upon internally generated keys.

The method of encryption begins at 310. The client, or user of the files to be backed up, selects a string of characters that the encryption system accepts at step 312. The characters are converted to their American Standard Code for Information Interchange (ASCII) equivalents and step 314. At step 316, all ASCII equivalents of all characters selected by the client are multiplied. The product is then divided by the number of characters contained on a plurality of CD-ROMs containing random numbers, at step 318. Step 320 increments the number of divisions that have occurred. Step 322 determines whether the quotient obtained from the division of step 318 is less than the number of characters on the plurality of CD-ROMs. If not, the method follows "no" branch "324" and returns to step 318 for further divisions. If the quotient is less than the number of characters on the CD-ROMs, the method follows "yes" branch 323 to step 326. At step 326, the number of the CD-ROM that is to be used to select the initial random numbers to be used as the first encryption keys are set to equal the number of divisions. For example, if five divisions are required, CD-ROM number five will be used.

At step 328, the remainder of the last division is used to determine the starting position on the CD-ROM. A predetermined set of random numbers, stored on the CD-ROM beginning at the starting position as determined by the remainder, is transferred to the data security card at step 330. At step 332, the compression program uses the predetermined set of random numbers to generate an initial encryption key, an identifier for an initial one of a predetermined number of encryption algorithms stored within the compression program on the client computer, and an initial block length of characters to be encrypted using the initial encryption key and algorithm.

To encrypt data, the compression program makes a request to the data security card. There are two alternative methods by which the data security card can process the request. When using the systematic selection method, the card obtains and then increments a value representing the number of requests that have been received for the key. A value representing the length of the key is also obtained and then multiplied by the number of requests received. The product uniquely identifies the positions of the random numbers representing the encryption key, the encryption algorithm to be used, and the block length representing the number of characters to be encrypted. Alternatively, upon receiving the request, the data security card examines the value in the starting position location. From that position in the memory, the card obtains four values: an encryption key, an encryption algorithm number, a block length, and a new starting position. The new starting position is placed in the starting position location on the card. The number of requests to the card is first obtained and then incremented. This number plus the other values are returned to the compression program. If the block length and/or the encryption algorithm are fixed, those values are ignored. Otherwise, the number of characters identified by the block length value are encrypted using the encryption algorithm determined by the encryption algorithm number and the encryption key returned from the data security card. The number of requests processed is added to the encrypted data by the compression program uniquely identifying the respective encryption key, encryption algorithm, and block length for the data encrypted.

At step 334, the compression program encrypts the data to be transmitted to the backup site. The number of characters identified by the random numbers representing the block length are encrypted using the encryption key and encryption algorithm identified by the set of random numbers. After the compression program encrypts the data, the transmission program encrypts the encrypted data at step 336. Thus, two levels of encryption are used. The transmission program uses encryption keys to which the client does not have access. Thus, one level of encryption performed by the compression program uses multiple, indirect keys, variable algorithms, and variable block lengths generated from a client-selected string of characters and without which the data cannot be restored, while the second level of encryption is performed by the transmission program that generates its own key. The methods of encryption are well known in the art and are not the subject of this invention.

At step 338, the compression program varies the random numbers used as the encryption key for the first level of encryption after a predetermined number of characters, determined by the block length, have been encrypted. The compression program calls the data security card for additional random numbers to serve as keys. If all files to be transmitted to the backup site have been encrypted, as determined at step 340, the method follows "yes" branch 341 and the encryption method terminates at 344. If additional files require encryption, the method follows "no" branch 342 and returns to step 334, where the compression program encrypts the file data using a new encryption key, a new encryption algorithm, and a new block length as determined by the additional random numbers obtained from the data security card.

Therefore, the backup system of the present invention utilizes several security enhancing measures. The present invention uses two levels of encryption. The first level of encryption utilizes multiple indirect keys, variable algorithms, and variable block length support based on a client-selected key, thus increasing the level of security for backed up client file data. The second level of encryption is provided by the transmission program.

The transmission encryption is decrypted at the backup site. The are two decryption methods used, depending on the encryption method used. Where systematic key selection is employed, the request number is multiplied by the key length to uniquely identify the location of the encryption key, algorithm, and block length. Alternatively, when random selection has been used, decryption of the client encryption is implemented by creating an area of memory locations based on the request number. The creation of this array requires the value for the original starting location. For each block of data to be decrypted, the request number attached to the data block is obtained, the corresponding location on the card is obtained from the array. The encryption key, algorithm, and block length are then obtained and used to decrypt the data. It should be noted that for the random method, a person obtaining both the data and the data security card cannot decrypt the data without the original value of the starting position.

Program Registry

The backup system of the present invention reduces the data stored at the backup site and further accomplishes the goal of copying only the data that has been changed since the most previous backup operation by utilizing a program registry. The program registry relies on the fact that much of the information stored on computer systems includes relatively static programs purchased from other sources. For instance, operating systems such as DOS and Windows, and application programs such as Word Perfect, Lotus 1-2-3, and Excel are purchased prewritten and loaded onto computer systems. Certain of these large commercially-available programs may be slightly altered by a client to effectively customize the program to meet the client's specific needs. Whenever a backup operation is performed, the present invention identifies these types of programs by a token and stores only the token, thus drastically reducing the space required to store the backup data at the remote site.

The use of the program registry, shown in FIG. 2 at 74, is further described in the flow chart of FIG. 13. The method begins at 200. If files are being transmitted from the client site to the backup site, as determined at step 202, the method follows "yes" branch 203 to step 206, where the extension of the incoming file is examined. If no files are incoming, the method follows "no" branch 204 and the method of the program registry terminates at 240.

Preferably, the program registry is a data base of files stored on the backup computer at the backup site. Alternatively, the program registry can also be maintained at the client site such that the files to be backed up that are located in the registry can be identified and replaced by a token prior to transmission to the backup site. Additionally, the registry can be maintained at the backup site and a list of files to be transmitted from the client site to the backup site can be maintained at the client site. The list of files is compared to the files in the registry over the transmission channel prior to compression and transmission of the actual file data. Any file located in the registry is replaced by an associated token, thus reducing the amount of data transmitted from the client site to the backup site. In these alternative configurations, no comparison for differences between the copies of files located at the client site and those files within the registry is performed.

In the preferred embodiment, the backup computer examines each incoming file transmitted from the client site and received at the backup site. Each incoming file is examined by file type or file extension. For example, DOS executable files have the extension .EXE or .COM and Windows program file extension include .DLL and .VBX. The registry includes one master copy of each file. If the backup computer at the backup site determines, at step 208, that the extension of the incoming file does not exist in the program registry, the method follows "no" branch 210 and returns to step 202 to wait for incoming files. If the extension of the incoming file exists within the registry, the method follows "yes" branch 209 to step 212. At step 212, the backup computer determines whether a master copy of the incoming file exists in the registry. The backup computer compares the name, date, and size of the incoming file to the master copy of the file stored within the registry to determines whether a copy of the incoming file exists. It should be understood that different versions of commercially available software exist that contain many differences. Thus, merely comparing the names of files does not sufficiently determine whether an identical or nearly identical copy of the incoming file is stored in the program registry.

If the backup computer determines that a master copy of the incoming file is not stored in the program registry, the method follows "no" branch 214 and returns to step 202 to process a subsequent incoming file. If a master copy of the incoming file exists in the program registry, the method follows "yes" branch 213 to step 216 where a byte-by-byte comparison of the incoming file and the master copy is made. If no changes are identified between the incoming and master files, as determined at step 218, the method follows "no" branch 220 to step 222, where the incoming file is replaced by a token and the token is stored at the backup site. The method then returns to step 202 to search for further incoming files.

If step 218 discovers changes between the incoming and master files, the method follows "yes" branch 219 to step 224 where a record of the changes and the location of the changes within the master file, defined by a byte offset from the beginning of the master file, is maintained. If the number of bytes that are changed in the incoming file as compared to the master file exceed a predetermined percentage of the size of the master file, as determined at step 226, the method follows "yes" branch 227 to step 230, where the entire incoming file is written to the storage medium at the backup site. The predetermined percentage is preferably equal to 25 percent of the size of the master file, although other percentages may be utilized. If the changes to the incoming file do not exceed 25 percent of the size of the master file, the method follows "no" branch 228 to step 232 where the system determines whether the end of the incoming file has been reached. If not, the method follows "no" branch 234 and returns to step 216 for comparison of subsequent bytes of the incoming file. If the end of the incoming file has been reached, the method follows "yes" branch 233 to step 236 where the incoming file is identified by a token. The token is stored at the backup site along with the changes and the location of the changes identified by an offset from the beginning of the master file, at step 238. The method then returns to step 202 to process subsequent incoming files.

It should be understood that the advantages achieved by the program registry include storing large, static files at the backup site as a token, rather than storing the entire contents of the static file. The token is recognized by the backup computer as representing the master copy, and when a restoration of a client files is required, the master copy is substituted for the token. Because a token is small and requires much less storage space than a large program, the capacity requirements of the backup storage facility are dramatically reduced. Also, storing a token in place of a large file decreases the amount of time required for the backup operation to complete.

From the foregoing it will be appreciated that the preferred embodiment of the present invention overcomes the drawbacks of the prior art described hereinabove and accomplishes the previously stated objects of the present invention. From the description of the preferred embodiment equivalents of the elements shown therein will suggest themselves to those skilled in the art and way of constructing other embodiments of the present invention will suggest themselves to practitioners of the art. Therefore, the scope of the present invention is to be limited only by the claims below.

What is claimed is:

1. A method for creating a backup copy of file data, stored on a client computer, on a backup computer, comprising the steps of:

maintaining a first table, stored in a battery-powered memory of a hard disk controller in the client computer, identifying each sector on the storage medium of the client computer;

storing an entry in the table for each sector, wherein each entry identifying whether or not each respective sector contains changed data; and writing to the backup computer only those sectors identified in the table as containing changed data.

2. A method for creating a new backup copy of file data stored on a client computer, of which an old backup copy has been stored on a backup computer, comprising the steps of:

storing the contents of all new sectors of a file containing changed data in the memory of the client computer;

storing the contents of each old sector to which changes have been made in the memory of the client computer;

comparing each respective old sector to the respective new sector containing changed data and identifying the changes;

maintaining a first table in the memory of the client computer identifying each sector on the storage medium of the client computer;

if the amount of the changes to a sector exceeds a predetermined amount, storing an entry in the table for the sector identifying the sector as containing changed data;

writing to the backup computer only those sectors identified in the table;

maintaining a second table in the memory of the client computer;

if the amount of the changes to a sector is less than the predetermined amount, storing in the second table the HCS number of the changed sector, the location of each change within the sector by storing in the second table a byte offset from the beginning of the sector, and the actual changed data; and writing to the backup computer the contents of the second table.

3. The method of claim 2 wherein the first and second table are maintained in the battery-powered memory of a hard disk controller in the client computer.

4. The method of claim 2 wherein the predetermined amount is one-half the number of bytes contained in a sector.

5. The method of claim 2 wherein said comparing step is performed by the hard disk controller in the client computer.

6. The method of claim 2 wherein said comparing step compares each byte of each corresponding old and new sector.

7. The method of claim 2 wherein the second table includes a first pointer and a second pointer, wherein for each changed sector the first pointer is placed at the beginning of the changed data and the second pointer is placed at the end of the changed data, and wherein the amount of changes to a sector is determined by determining the number of bytes between the first and second pointer.

8. The method of claim 2 further comprising transferring the contents of the second table to a hard disk in the client computer if the contents of the second table exceed a predetermined threshold.

9. A method for storing on a backup computer a backup copy of file data stored on a client computer, comprising the steps of:

maintaining a registry including a master copy of predetermined files;

determining whether a file to be backed up is included in the registry;

if the file is included in the registry, substituting a token identifying the master copy and storing the token on the backup computer;

if the file is not included in the registry, storing the file on the backup computer.

10. The method of claim 9 wherein the registry is maintained on the backup computer.

11. The method of claim 10 wherein said determining step and said substituting step are executed by the backup computer after the file has been transmitted from the client computer to the backup computer.

12. The method of claim 11 further comprising, after said determining step, the steps of:

comparing the file to the master copy and identifying any changes;

if the amount of the changes is less than a predetermined amount, storing on the backup computer each change identified between the file and the master copy and storing the location of each change by storing a byte offset from the beginning of the master copy of the file; and if the amount of changes is not less than the predetermined amount, writing the entire file to the backup computer.

13. The method of claim 12 wherein the predetermined amount is about one-quarter the size of the master copy.

14. The method of claim 12 wherein said comparing step compares each byte of the file and the corresponding master copy.

15. The method of claim 9 wherein the predetermined files include commercially-available computer programs.

16. The method of claim 9 wherein said determining step comprises comparing the name, date, and size of the file with that of the files stored in the registry.

17. The method of claim 9 wherein a copy of at least a portion of the registry is maintained on the client computer.

18. The method of claim 17 wherein said determining step and substituting step are executed prior to the transmission of the file from the client computer to the backup computer.

19. The method of claim 10 further comprising the steps of:

maintaining a list, on the client computer, of files to be backed up;

wherein said determining step is performed prior to the transmission of the file from the client computer to the backup computer by comparing the files on the list to the registry stored on the backup computer; and wherein said substituting step is performed by the client computer prior to transmission of the file from the client computer to the backup computer if the file is included in the registry.

20. A method for transmitting and storing a backup copy of file data, stored on a client computer, on a backup computer, comprising the steps of:

examining each client file and identifying all instances of predetermined types of data elements;

maintaining an encoding data base, stored in the memory of the client computer, containing a unique code for each type of data element;

substituting the corresponding code for all instances of the predetermined data elements in each file;

transmitting each file from the client computer to the backup computer; and storing a backup copy of each file on the backup computer.

21. The method of claim 20 wherein said data base is stored in the memory of a data security card on the client computer.

22. A method for encrypting a copy of a file from a client computer to a backup computer, comprising the steps of:

obtaining a string of characters from a user of the client computer;

transforming the string of characters to select a set of random numbers from a stored group of random numbers;

using the set of random numbers to generate an initial encryption key, select an initial one of a predetermined number of encryption algorithms, and select an initial block length for defining the number of characters to be encrypted; and encrypting the initial block length of characters using the initial encryption key and initial encryption algorithm.

23. The method of claim 22 further comprising the steps of:

after said encrypting step, using additional random numbers from the set of random numbers to generate a second encryption key, select a second encryption algorithm, and select a second block length;

encrypting the second block length of characters using the second encryption key and second encryption algorithm; and continuing to encrypt additional block lengths of characters using additional encryption keys and additional encryption algorithms selected by additional random numbers from the set of random numbers until all characters have been encrypted.

24. The method of claim 23 further comprising additionally encrypting all characters to be transmitted to the backup computer using another encryption algorithm prior to transmission from the client computer to the backup computer.

25. The method of claim 22 wherein the group of random numbers is stored on at least one CD-ROM.

26. The method of claim 25 wherein the transformation of the string selects a CD-ROM of random numbers and defines a starting position on the CD-ROM, and wherein the set of random numbers is obtained from the CD-ROM beginning at the starting position.

27. The method of claim 22 wherein the set of random numbers is copied to, and stored in, the battery powered memory of a data security card in the client computer.

28. A method for creating a new backup copy of at least one file comprising data blocks of predetermined size, stored on a client computer, of which an old backup copy has been stored on a backup computer, comprising the steps of:

maintaining a data base, stored in the memory of the client computer, for storing a unique code for each data block of each file;

reading each data block of a predetermined file;

generating a code associated with each data block;

comparing each generated code to the codes stored in the data base;

replacing each data block with a corresponding token and placing each token in a transmission file in the client computer if the respective generated code matches a code in the dam base;

if the respective generated code does not match a code in the data base:

placing each data block intact in the transmission file; writing the generated code to the data base;

transmitting the transmission file to the backup computer; and storing the transmission file on the backup computer.

29. The method of claim 28 wherein the predetermined files are those files exceeding a predetermined size.

30. The method of claim 28 further comprising the following steps, performed by the backup computer prior to said step of storing the transmission file:

reading each file in the transmission file;

writing the corresponding data block from the backup copy of the file to a new copy, stored in the memory of the backup computer, if a data block is represented by a token;

writing the data block from the file to the new copy if the data block is not represented by a token; and storing the new copy on the backup computer.

31. The method of claim 28 further comprising the following steps, performed by the backup computer prior to said step of storing the transmission file:

reading each file in the transmission file;

writing the data block from the file to the corresponding location in the backup copy of the file if the data block is not represented by a token; and leaving the corresponding data block in the backup copy if the data block from the file is represented by a token.

32. A method for transmitting and storing a backup copy of file data, stored on a client computer, on a backup computer, comprising the steps of:

determining the available transmission channel capacity;

rating each file stored on the client computer according to predetermined criteria;

storing the rating of each file in a priority data base stored in the memory of the client computer;

creating a transmission file of finite size, determined by the transmission channel capacity, in the memory of the client computer for determining the sequence of transmitting files from the client computer to the backup computer;

storing files in the transmission file;

transmitting the contents of the transmission file to the backup computer; and storing the contents of the transmission file on the backup computer.

33. The method of claim 32 wherein said step of storing files in the transmission file comprises:

selecting the highest rated file from the priority data base;

transferring the highest rated file in the transmission file; and repeating said steps of selecting and transferring until the transmission file has been filled.

34. The method of claim 32 wherein the predetermined criteria includes whether the file is unique to the client site, whether the file has previously been transmitted to the backup computer, the size of the file, the date that the file was created, and information density of the file.

35. The method of claim 32 wherein said step of storing files in the transmission file comprises:

creating an array of finite size, determined by the transmission channel capacity, in the memory of the client computer;

storing the highest rated files in the array; and transmitting the array to the backup computer.

36. The method of claim 35 wherein said step of storing the highest rated files in the array comprises:

storing arbitrary files in the array until the array is full;
identifying the lowest rated file in the array;
comparing the rating of files outside the array to the lowest rated file in the array; and
if said comparing step identifies a file outside the array having a higher rating than the lowest rated file in the array:

adding the identified file to the array and deleting the lowest rated file from the array; and
continuing said comparing, adding, and deleting steps as necessary for all files initially outside the array.

\* \* \* \* \*